United States Patent
Higuchi et al.

(10) Patent No.: US 8,326,977 B2
(45) Date of Patent: Dec. 4, 2012

(54) RECORDING MEDIUM STORING SYSTEM ANALYZING PROGRAM, SYSTEM ANALYZING APPARATUS, AND SYSTEM ANALYZING METHOD

(75) Inventors: Junichi Higuchi, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 12/549,040

(22) Filed: Aug. 27, 2009

(65) Prior Publication Data
US 2010/0017401 A1      Jan. 21, 2010

Related U.S. Application Data

(63) Continuation-in-part of application No. 12/436,518, filed on May 6, 2009.

(30) Foreign Application Priority Data

Jul. 16, 2008  (JP) .................................. 2008-184591
May 18, 2009  (JP) .................................. 2009-120002

(51) Int. Cl.
*G06F 15/173* (2006.01)

(52) U.S. Cl. ......... 709/224; 709/202; 709/206; 709/223

(58) Field of Classification Search .................. 709/203, 709/206, 223, 226; 717/104, 105, 127, 131; 718/102, 106
See application file for complete search history.

(56) References Cited

U.S. PATENT DOCUMENTS

| | | | |
|---|---|---|---|
| 5,539,922 A | 7/1996 | Wang | |
| 5,787,253 A | 7/1998 | McCreery et al. | |
| 5,787,300 A | 7/1998 | Wijaya | |
| 5,835,710 A | 11/1998 | Nagami et al. | |
| 5,878,420 A | 3/1999 | de la Salle | |
| 6,041,042 A * | 3/2000 | Bussiere | 370/245 |
| 6,061,679 A | 5/2000 | Bournas et al. | |
| 6,112,173 A | 8/2000 | Hirayama | |
| 6,138,123 A | 10/2000 | Rathbun | |
| 6,167,538 A * | 12/2000 | Neufeld et al. | 714/47 |
| 6,178,449 B1 | 1/2001 | Forman et al. | |
| 6,314,434 B1 | 11/2001 | Shigemi et al. | |
| 6,393,480 B1 * | 5/2002 | Qin et al. | 709/224 |

(Continued)

FOREIGN PATENT DOCUMENTS
JP      A 2006-11683      1/2006

*Primary Examiner* — David Lazaro
*Assistant Examiner* — Sarah Drabik
(74) *Attorney, Agent, or Firm* — Greer, Burns & Crain, Ltd.

(57) ABSTRACT

A system analyzing apparatus obtains a message group including a message ID, a protocol, a type, and a transmission time of messages transmitted/received in a system where a hierarchical structure of protocols is defined. The apparatus detects pairs of a request message and a response message of the same message ID from the obtained message group. The apparatus identifies a request time and a response time of each of the detected pairs. The apparatus searches for a child-layer pair that has a request time and a response time between the request time and the response time of a parent-layer pair arbitrarily selected from among the pairs and that has a protocol in a layer lower than the protocol of the parent-layer pair on the basis of the identified result. The apparatus outputs the found child-layer pair as a candidate pair having a call relationship with the parent-layer pair.

14 Claims, 29 Drawing Sheets

U.S. PATENT DOCUMENTS

| | | |
|---|---|---|
| 6,421,321 B1 | 7/2002 | Sakagawa et al. |
| 6,510,425 B1 | 1/2003 | Okamoto et al. |
| 6,650,731 B1 | 11/2003 | Steltner et al. |
| 6,665,725 B1 | 12/2003 | Dietz et al. |
| 6,854,018 B1 | 2/2005 | Li et al. |
| 6,898,556 B2 * | 5/2005 | Smocha et al. ............... 702/186 |
| 6,915,243 B1 | 7/2005 | Inoue et al. |
| 6,931,418 B1 | 8/2005 | Barnes |
| 6,941,555 B2 | 9/2005 | Jacobs et al. |
| 7,027,051 B2 * | 4/2006 | Alford et al. .................. 345/440 |
| 7,111,204 B1 * | 9/2006 | Couturier et al. ............... 714/39 |
| 7,143,014 B2 | 11/2006 | Upreti |
| 7,187,694 B1 | 3/2007 | Liao |
| 7,200,215 B2 | 4/2007 | Brown et al. |
| 7,206,805 B1 | 4/2007 | McLaughlin, Jr. |
| 7,350,077 B2 | 3/2008 | Meier et al. |
| 7,383,331 B2 * | 6/2008 | Takahashi et al. ............ 709/224 |
| 7,509,408 B2 | 3/2009 | Kurita |
| 7,512,676 B2 | 3/2009 | O'Neal et al. |
| 7,561,549 B2 | 7/2009 | Meier et al. |
| 7,613,150 B2 | 11/2009 | Nagarajan et al. |
| 7,639,648 B2 | 12/2009 | Nagarajan et al. |
| 7,706,345 B2 | 4/2010 | Meier et al. |
| 7,747,753 B2 | 6/2010 | Nagami et al. |
| 7,769,843 B2 | 8/2010 | Neuse et al. |
| 7,779,101 B1 | 8/2010 | Zahavi et al. |
| 7,783,330 B2 | 8/2010 | Dobrowski et al. |
| 7,805,510 B2 | 9/2010 | Bansal et al. |
| 7,826,869 B2 | 11/2010 | Nagarajan et al. |
| 2002/0198985 A1 * | 12/2002 | Fraenkel et al. ............. 709/224 |
| 2003/0065986 A1 | 4/2003 | Fraenkel et al. |
| 2003/0156700 A1 | 8/2003 | Brown et al. |
| 2004/0015590 A1 | 1/2004 | Nagami et al. |
| 2004/0103282 A1 | 5/2004 | Meier et al. |
| 2004/0122942 A1 | 6/2004 | Green et al. |
| 2004/0133848 A1 | 7/2004 | Hunt et al. |
| 2004/0264811 A1 | 12/2004 | Yano et al. |
| 2005/0100025 A1 | 5/2005 | Nagami et al. |
| 2005/0102384 A1 | 5/2005 | Ueno et al. |
| 2005/0289231 A1 * | 12/2005 | Harada et al. ................. 709/224 |
| 2006/0010097 A1 | 1/2006 | Hashimoto |
| 2006/0122985 A1 * | 6/2006 | Yamamoto et al. ............... 707/3 |
| 2006/0136513 A1 | 6/2006 | Ngo et al. |
| 2006/0294152 A1 | 12/2006 | Kawabe et al. |
| 2007/0260595 A1 | 11/2007 | Beatty et al. |
| 2007/0299969 A1 | 12/2007 | Kunitake et al. |
| 2008/0015450 A1 | 1/2008 | Ye et al. |
| 2008/0082519 A1 | 4/2008 | Zentner |
| 2008/0109392 A1 | 5/2008 | Nandy |
| 2009/0063556 A1 | 3/2009 | Nemoto et al. |
| 2009/0138471 A1 | 5/2009 | Zhang et al. |
| 2009/0282062 A1 | 11/2009 | Husic |

* cited by examiner

| LAYER | PROTOCOL |
|---|---|
| 1 | HTTP |
| 2 | IIOP |
| 3 | SQL |

FIG. 7

MESSAGE DB ~700

| MESSAGE ID | TIME STAMP (TRANSMISSION TIME) | PROTOCOL | TYPE OF MESSAGE | URL |
|---|---|---|---|---|
| H1 | 00:00:00:000 | HTTP | REQUEST | URL1 |
| I1 | 00:00:00:001 | IIOP | REQUEST | |
| S1 | 00:00:00:002 | SQL | REQUEST | |
| S1 | 00:00:00:004 | SQL | RESPONSE | |
| I1 | 00:00:00:006 | IIOP | RESPONSE | |
| H2 | 00:00:00:007 | HTTP | REQUEST | URL2 |
| I2 | 00:00:00:009 | IIOP | REQUEST | |
| S2 | 00:00:00:012 | SQL | REQUEST | |
| S2 | 00:00:00:014 | SQL | RESPONSE | |
| I3 | 00:00:00:015 | IIOP | REQUEST | |
| S3 | 00:00:00:016 | SQL | REQUEST | |
| S3 | 00:00:00:020 | SQL | RESPONSE | |
| I2 | 00:00:00:021 | IIOP | RESPONSE | |
| H1 | 00:00:00:024 | HTTP | RESPONSE | |
| I3 | 00:00:00:025 | IIOP | RESPONSE | |
| H2 | 00:00:00:027 | HTTP | RESPONSE | |

| PAIR ID | MESSAGE ID | LAYER | REQUEST TIME | RESPONSE TIME |
|---|---|---|---|---|
| P1 | H1 | 1 | 00:00:00:000 | 00:00:00:024 |
| P2 | I1 | 2 | 00:00:00:001 | 00:00:00:006 |
| P3 | S1 | 3 | 00:00:00:002 | 00:00:00:004 |
| P4 | H2 | 1 | 00:00:00:007 | 00:00:00:027 |
| P5 | I2 | 2 | 00:00:00:009 | 00:00:00:021 |
| P6 | S2 | 3 | 00:00:00:012 | 00:00:00:014 |
| P7 | I3 | 2 | 00:00:00:015 | 00:00:00:025 |
| P8 | S3 | 3 | 00:00:00:016 | 00:00:00:020 |

800
800-1
800-4
800-8

| PAIR ID | RESPONSE PERIOD |
|---|---|
| P1 | 24 |
| P2 | 5 |
| P3 | 2 |
| P4 | 20 |
| P5 | 12 |
| P6 | 2 |
| P7 | 10 |
| P8 | 4 |

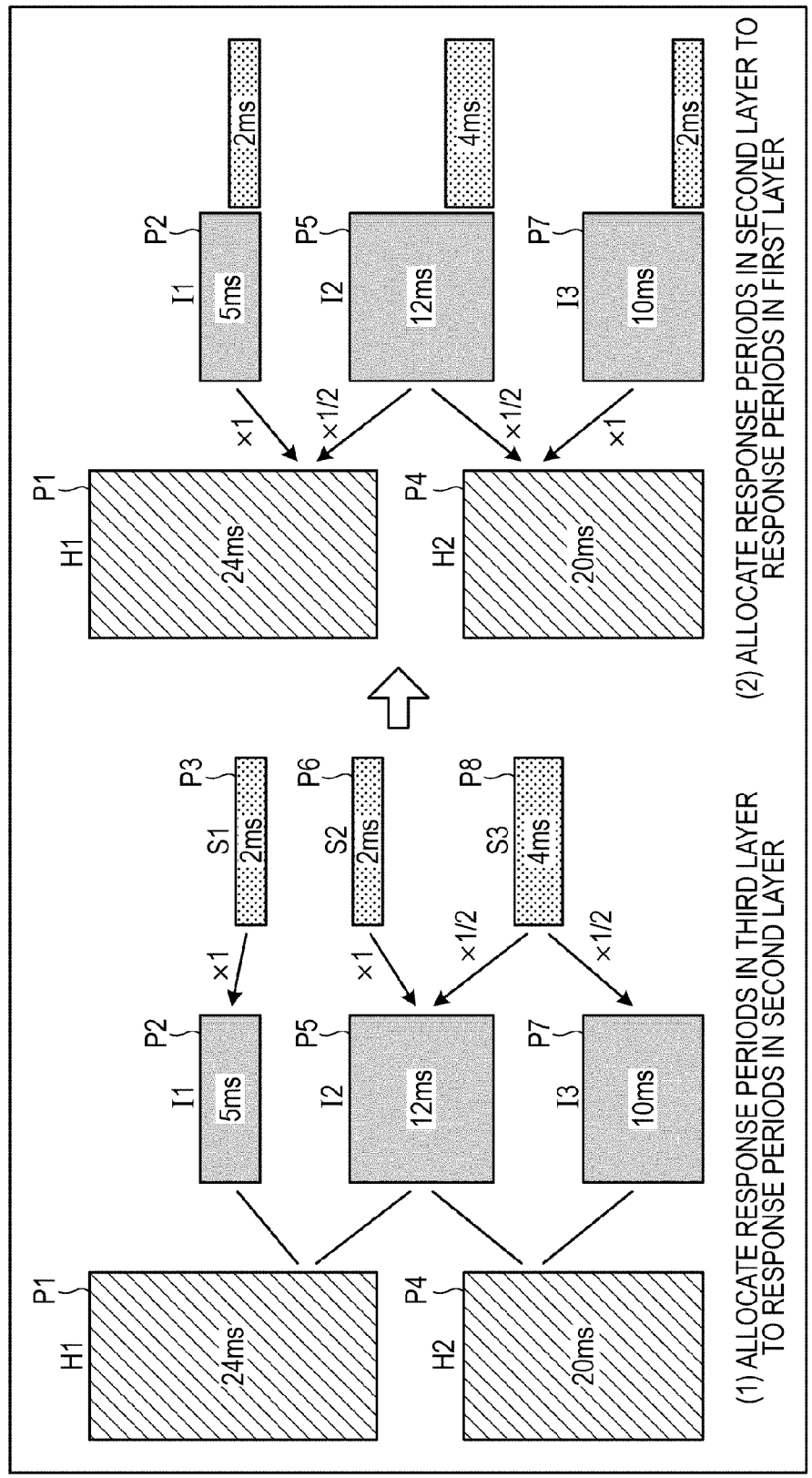

| URL | WEB SERVER | AP SERVER | DB SERVER |
|---|---|---|---|
| URL1 | 13 | 7 | 4 |
| URL2 | 4 | 12 | 4 |

| URL | AVERAGE PROCESSING PERIOD | | |
|---|---|---|---|
| | WEB SERVER | AP SERVER | DB SERVER |
| URL1 | 15 | 8 | 5 |
| URL2 | 6 | 10 | 4 |
| ⋮ | ⋮ | ⋮ | ⋮ |
| URLk | ... | ... | ... |

RECORDING MEDIUM STORING SYSTEM ANALYZING PROGRAM, SYSTEM ANALYZING APPARATUS, AND SYSTEM ANALYZING METHOD

CROSS-REFERENCE TO RELATED APPLICATIONS

This application is a continuation-in-part of U.S. patent application Ser. No. 12/436,518, filed on May 6, 2009. This application is based upon and claims the benefit of priority of the prior Japanese Patent Application No. 2008-184591, filed on Jul. 16, 2008, and the prior Japanese Patent Application No. 2009-120002, filed on May 18, 2009, the entire contents of which are incorporated herein by reference.

FIELD

The disclosed technique relates to a technique of analyzing operation statuses of servers in a network system where a hierarchical structure of communication protocols is defined.

BACKGROUND

In recent years, it has become difficult to properly recognize operation statuses and problems in the performance of large-scale and complicated network systems. This is because, in a complicated network system in which a plurality of applications operate in conjunction with each other, the performance of the entire system in addition to the behavior of each server needs to be observed and analyzed in order to determine the cause of degradation in performance and failure.

Under such circumstances, there has been disclosed a conventional technique of recognizing a specific operation status of a target system and quickly solving a problem in performance by analyzing the operation status of an entire network system by using a transaction model that defines the transmission/reception of messages among a plurality of servers in the network system.

The above-described related art involves the necessity to create a transaction model for analyzing the system in advance. However, creation of the transaction model requires specific information of messages and verification depending on the knowledge and know-how of an operator. Accordingly, the time and load of an analyzing operation increase, which results in a disadvantageous increase in introduction cost for system analysis.

The disclosed technique addresses the above-described problems of the related art and easily analyzes operation statuses of servers in a system without the need to create a transaction model in advance.

SUMMARY

A system analyzing apparatus obtains a message data group including a message ID, a protocol, a type, and a transmission time of each of several messages transmitted/received in a system where a hierarchical structure of protocols is defined. The apparatus detects pairs of a request message and a response message of the same message ID from the obtained message data group. The apparatus identifies a request time and a response time of each of the detected pairs. The apparatus searches for a child-layer pair that has a request time and a response time between the request time and the response time of a parent-layer pair arbitrarily selected from among the pairs and that has a protocol in a layer lower than the protocol of the parent-layer pair on the basis of the identified result. The apparatus outputs the found child-layer pair as a candidate pair having a call relationship with the parent-layer pair.

BRIEF DESCRIPTION OF DRAWINGS

FIG. 7 illustrates content stored in a message DB;
FIG. 8 illustrates an example of a pair information table;
FIG. 13A illustrates an outline of a calculating process of calculating processing periods of servers;
FIG. 16 illustrates a third example of the output result.

DESCRIPTION OF EMBODIMENTS

Hereinafter, an embodiment is described in detail with reference to the attached drawings. The disclosed technique analyzes an operation status of each server by analyzing a parent-child relationship between messages transmitted/received in a system where a hierarchical structure of protocols is defined and by estimating a response period in units of layers on the basis of a response period of each message.

(Configuration of Network System)

Figure 1:
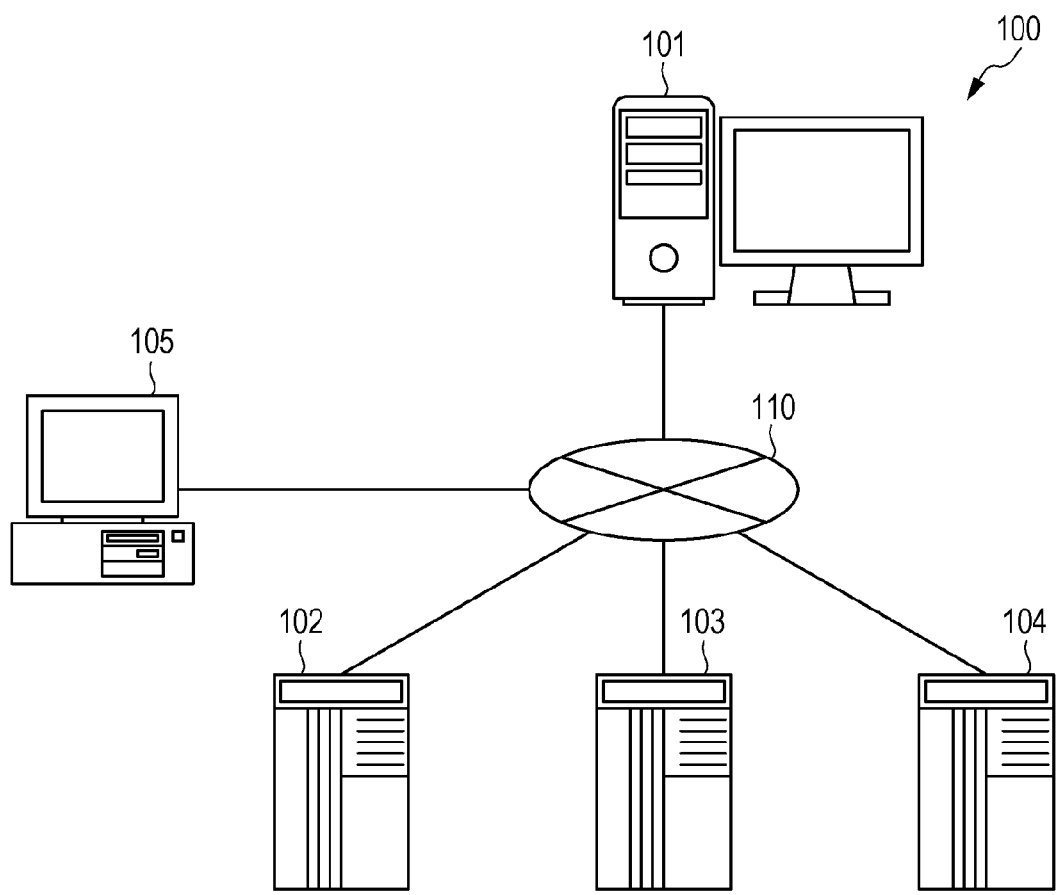
FIG. 1 illustrates a configuration of a network system.

First, a configuration of a network system according to the embodiment is described. FIG. 1 illustrates the configuration of the network system. Referring to FIG. 1, the network system 100 includes a system analyzing apparatus 101, a web server 102, an AP (application) server 103, a DB (database) server 104, and a client terminal 105, which are mutually connected via a network 110, such as the Internet, a LAN (Local Area Network), or a WAN (Wide Area Network), so that they can communicate with each other.

A hierarchical structure of protocols is defined in the network system 100. For example, HTTP (HyperText Transfer Protocol) is defined in a first layer as the highest layer. The HTTP is a protocol used in communication between the client terminal 105 and the web server 102.

IIOP (Internet Inter-ORB Protocol) is defined in a second layer. The IIOP is a protocol used in communication between the web server 102 and the AP server 103. SQL (Structured Query Language) is defined in a third layer as a lowest layer. The SQL is a protocol used in communication between the AP server 103 and the DB server 104.

The system analyzing apparatus 101 is a computer apparatus that analyzes messages transmitted/received in the network system 100 and that analyzes operation statuses of the servers in the network system 100 (web server 102, AP server 103, and DB server 104).

The web server 102 is a computer apparatus that transmits an HTML (HyperText Markup Language) file in response to a request from a browser installed in the client terminal 105. The AP server 103 is a computer apparatus that functions as an interface between the web server 102 and the DB server 104 and that controls searching and updating of a database.

The DB server 104 is a computer apparatus that executes the searching and updating of the database. For simplicity, FIG. 1 illustrates one web server 102, one AP server 103, one DB server 104, and one client terminal 105.

(Outline of Capture Function)

Figure 2:
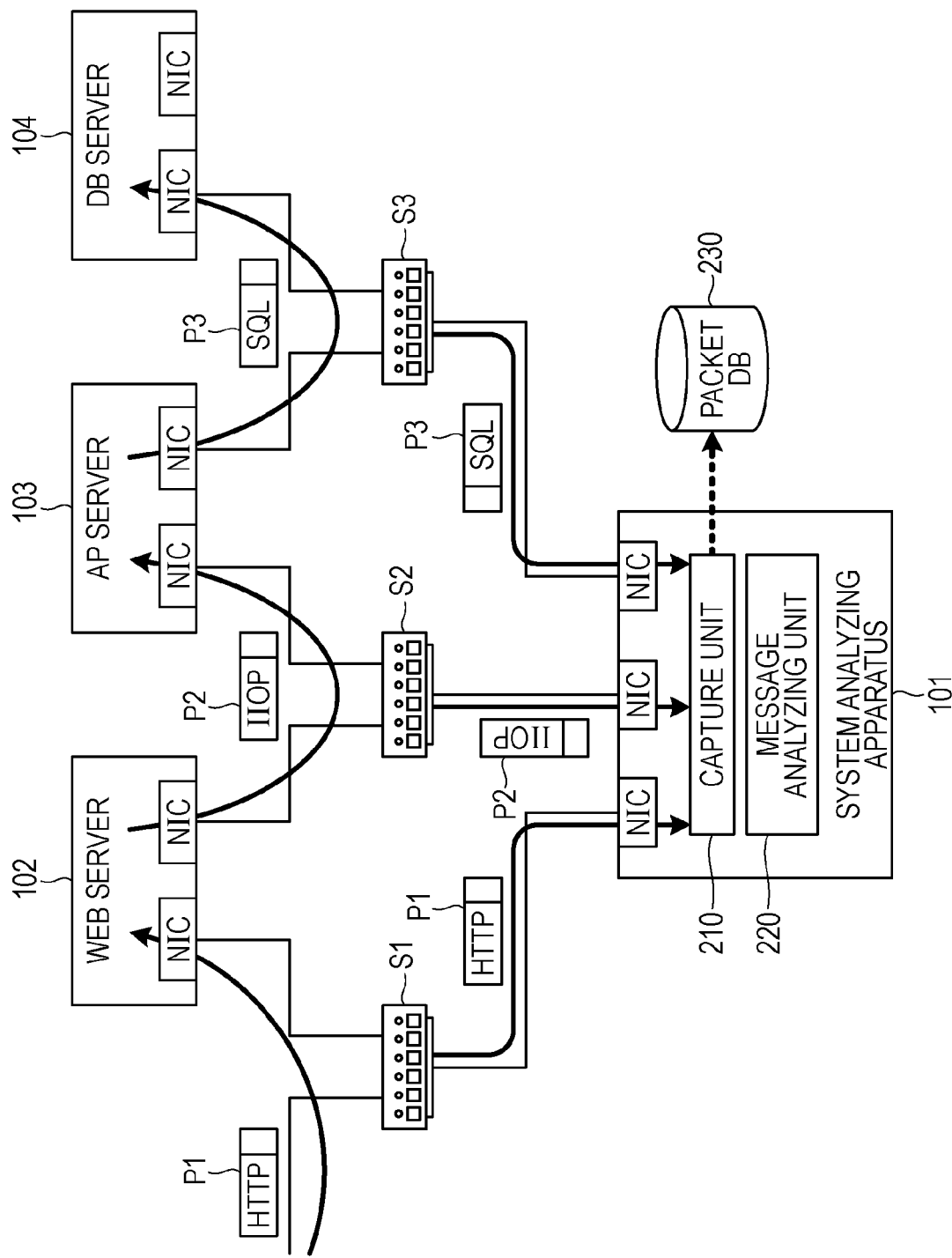
FIG. 2 illustrates an outline of a capture function.

Next, a capture function of the system analyzing apparatus 101 is described. FIG. 2 illustrates an outline of the capture function. Referring to FIG. 2, packets P1 to P3 of the respective protocols (HTTP, IIOP, and SQL) are transmitted/received among the web server 102, the AP server 103, and the DB server 104 via switches S1 to S3 provided in the network 110 (see FIG. 1).

Here, the system analyzing apparatus 101, the web server 102, the AP server 103, and the DB server 104 are coupled to respective ports of the switches S1 to S3. Those switches S1 to S3 have a function of mirroring data passing there through. Mirroring is a function of outputting data that is the same as the data output from a certain port from another port.

Here, the ports coupled to the system analyzing apparatus 101 are designated as mirroring destinations of the ports coupled to the web server 102, the AP server 103, and the DB server 104. Thus, packets addressed to the respective servers are input to the respective servers and are also input to the system analyzing apparatus 101.

For example, assume the case where the web server 102, the AP server 103, and the DB server 104 provide a service in conjunction with each other in response to a request from the client terminal 105 (see FIG. 1). In this case, a packet P1 is transmitted from the client terminal 105 to the web server 102.

At this time, a packet P1 having the same content as that of the packet P1 is input to the system analyzing apparatus 101. A packet P2 is transmitted from the web server 102 to the AP server 103, and a packet P2 having the same content as that of the packet P2 is input to the system analyzing apparatus 101. Furthermore, a packet P3 is transmitted from the AP server 103 to the DB server 104, and a packet P3 having the same content as that of the packet P3 is input to the system analyzing apparatus 101.

The packets P1 to P3 input to the system analyzing apparatus 101 are captured by a capture unit 210 coupled to the switches S1 to S3 and are stored in a packet DB 230. At this time, the capture unit 210 stores the packets P1 to P3 transmitted from the switches S1 to S3 in the packet DB 230, together with time stamps (receipt times).

Alternatively, the capture unit 210 may transmit the captured packets P1 to P3 to a message analyzing unit 220 (the details are described below) without storing the packets P1 to P3 in the packet DB 230. Alternatively, the capture unit 210 may capture only a random packet. Furthermore, only desired data may be selected and mirrored in the switches S1 to S3.

(Content Stored in Packet DB)

Figure 3:
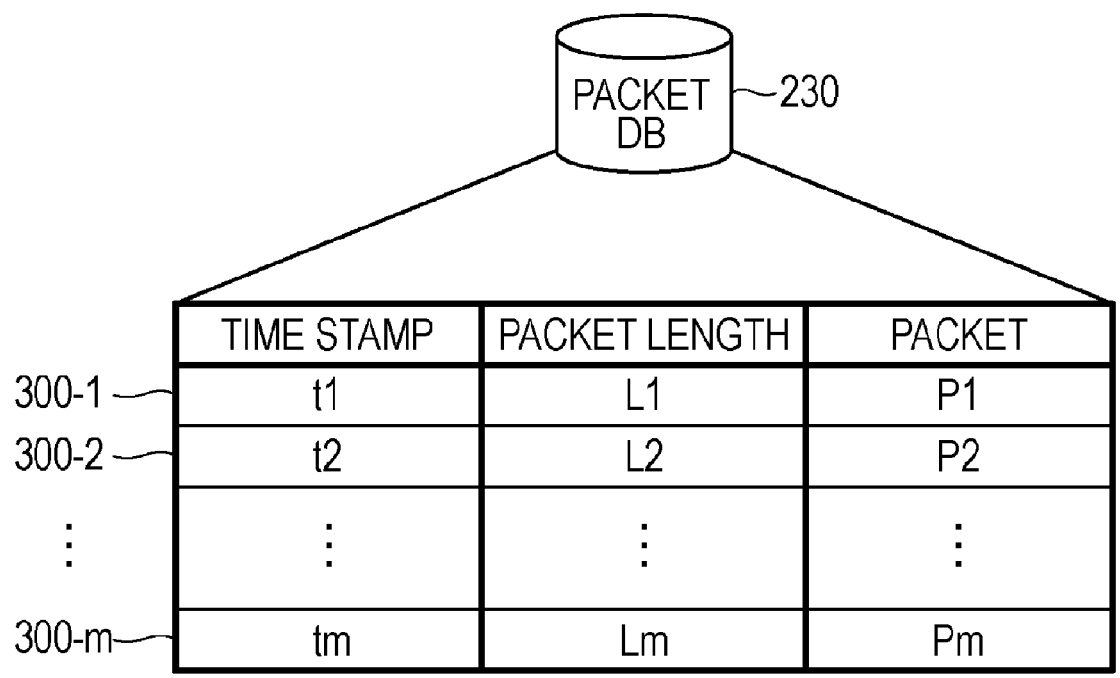
FIG. 3 illustrates content stored in a packet DB.

Now, content stored in the packet DB 230 is described. FIG. 3 illustrates the content stored in the packet DB 230. Referring to FIG. 3, the packet DB 230 stores packet data 300-1 to 300-m corresponding to the packets P1 to Pm captured by the capture unit 210 (see FIG. 2).

For example, packet data 300-1 to 300-m is composed of a time stamp, a packet length, and a packet. For example, the packet data 300-1 may include a time stamp t1, a packet length L1, and a packet P1.

(Hardware Configuration of System Analyzing Apparatus)

Figure 4:
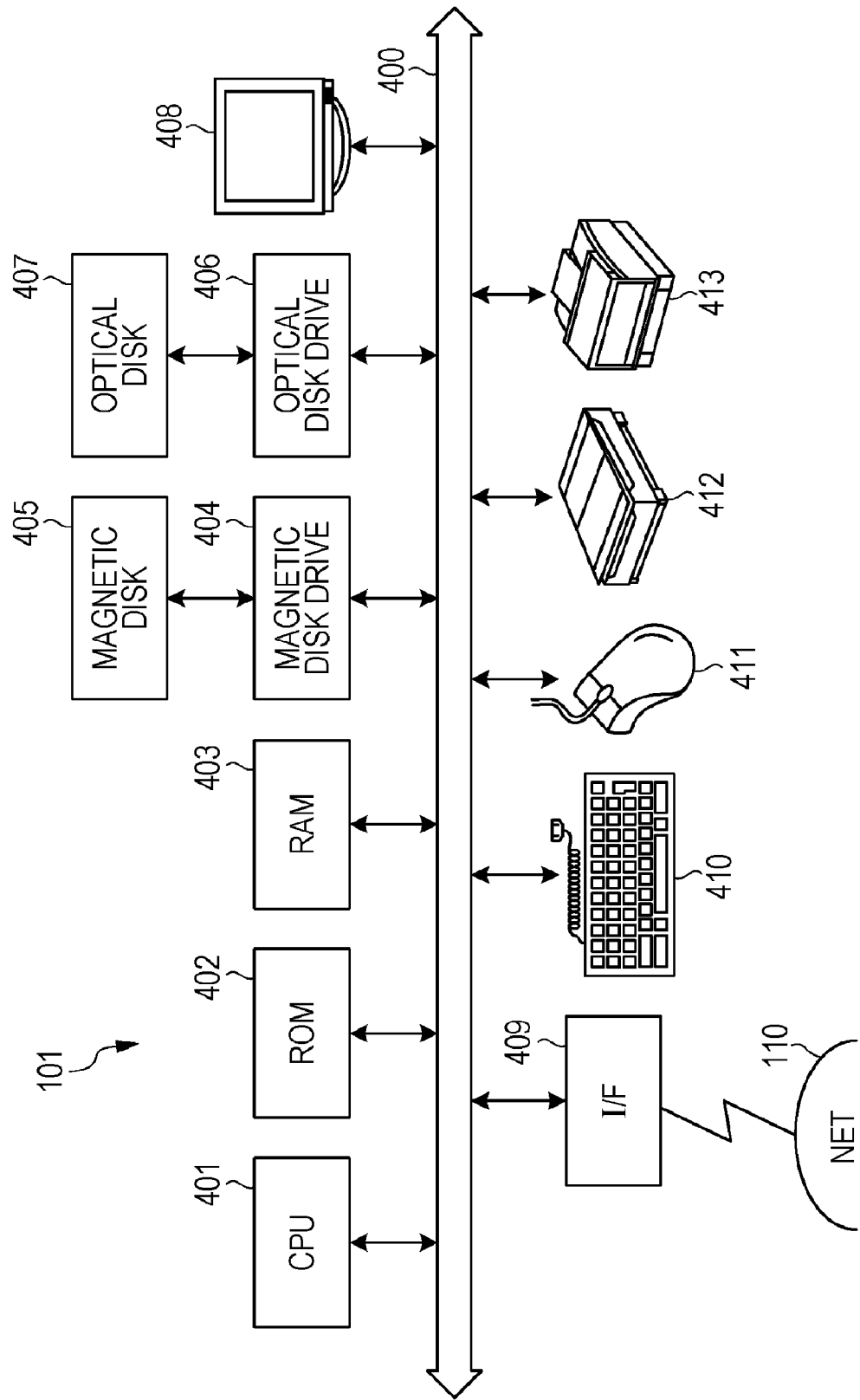
FIG. 4 is a block diagram illustrating a hardware configuration of a system analyzing apparatus.

Next, a hardware configuration of the system analyzing apparatus 101 according to the embodiment is described. FIG. 4 is a block diagram illustrating a hardware configuration of the system analyzing apparatus 101. Referring to FIG. 4, the system analyzing apparatus 101 includes a CPU (Central Processing Unit) 401, a ROM (Read Only Memory) 402, a RAM (Random Access Memory) 403, a magnetic disk drive 404, a magnetic disk 405, an optical disk drive 406, an optical disk 407, a display 408, an I/F (interface) 409, a keyboard 410, a mouse 411, a scanner 412, and a printer 413. The respective units are mutually connected via a bus 400.

The CPU 401 controls the entire system analyzing apparatus 101. The ROM 402 stores programs, such as a boot program. The RAM 403 may be used as a work area of the CPU 401. The magnetic disk drive 404 controls read/write of data from/on the magnetic disk 405 in accordance with control by the CPU 401. The magnetic disk 405 stores data written under control by the magnetic disk drive 404.

The optical disk drive 406 controls read/write of data from/ on the optical disk 407 in accordance with control by the CPU 401. The optical disk 407 stores data written under control by the optical disk drive 406 and allows a computer to read the data stored in the optical disk 407.

The display 408 displays a cursor, icons, tool boxes, and data such as a document, an image, or function information. As the display 408, a CRT (Cathode Ray Tube), a TFT (Thin-Film Transistor) liquid crystal display, or a plasma display may be adopted.

The interface (hereinafter referred to as I/F) 409 is connected to the network 110, such as a LAN, a WAN, or the Internet, via a communication line. Also, the I/F 409 may be connected to another apparatus via the network 110. Also, the I/F 409 manages the interface between the network 110 and the inside of the apparatus and controls input/output of data from/to an external apparatus. A modem or a LAN adaptor may be adopted as the I/F 409.

The keyboard 410 includes keys to input characters, numerals, and various instructions, and is used to input data. Alternatively, a touch-panel-type input pad or a numeric keypad may be used. The mouse 411 may be used to move the cursor, select a range, move a window, or change a size. Alternatively, a trackball or a joystick may be used as long as those devices are able to function as a pointing device.

The scanner 412 optically reads an image and captures image data into the system analyzing apparatus 101. The scanner 412 may have an OCR (Optical Character Reader) function. The printer 413 prints image data and document data. A laser printer or an inkjet printer may be adopted as the printer 413.

(Functional Configuration of System Analyzing Apparatus)

Next, a functional configuration of the system analyzing apparatus 101 is described. In the embodiment, processing periods of respective servers of requests that occur in a certain time unit (e.g., in units of hours or in units of days) are totaled for each address (e.g., URL: Uniform Resource Locator), whereby a simple average processing period of the servers may be statistically calculated for each address.

First, a description is given about a method for calculating the processing periods of the web server 102, the AP server 103, and the DB server 104 when a random address (e.g., URL1 or URL2 described below) is designated. Eventually, the processing periods of the respective servers in a certain time unit are totaled for each address and the average of the processing periods is calculated, whereby a simple average processing period of a server may be statistically calculated for each address.

Figure 5:
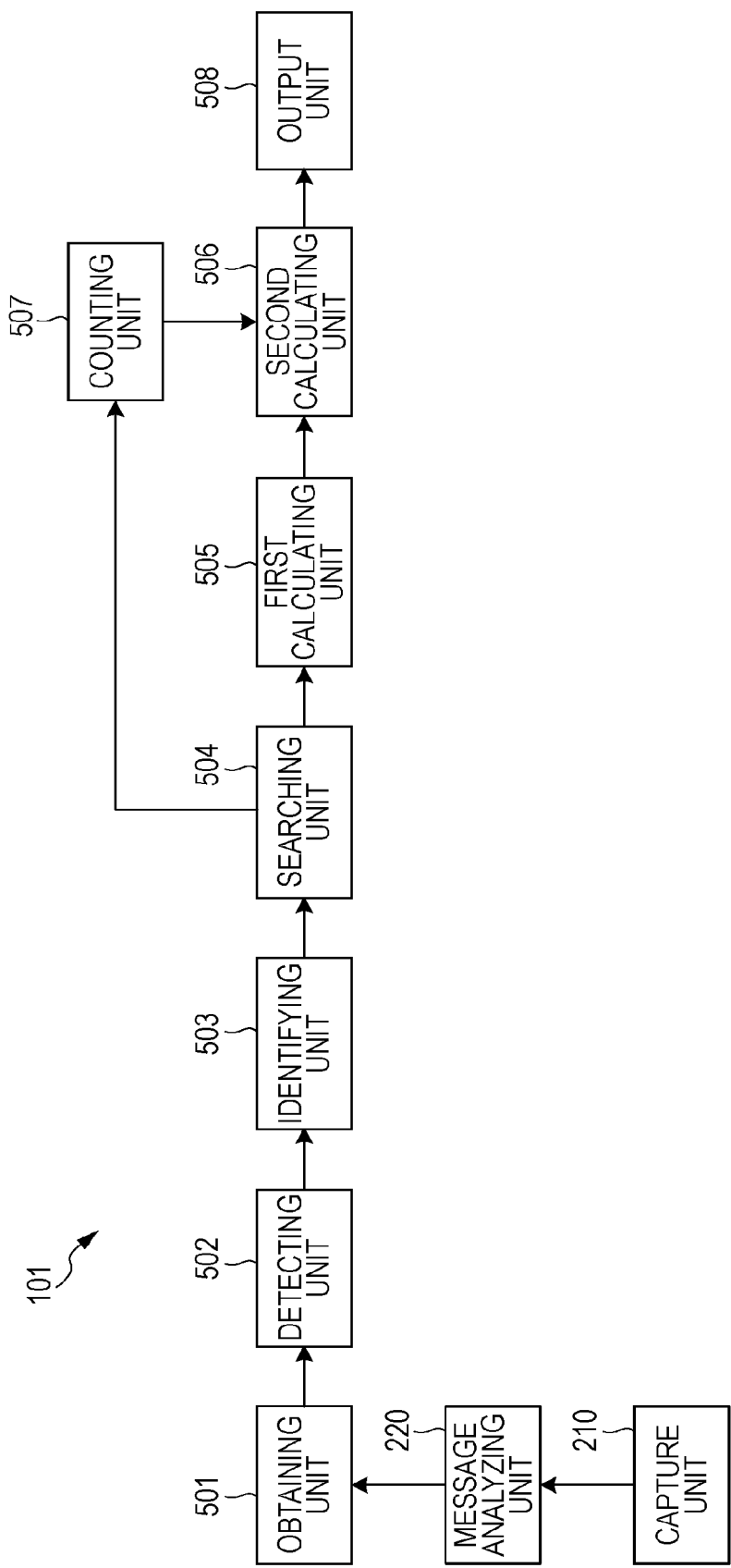
FIG. 5 is a block diagram illustrating a functional configuration of the system analyzing apparatus.

FIG. 5 is a block diagram illustrating a functional configuration of the system analyzing apparatus 101. The system analyzing apparatus 101 includes the capture unit 210, the message analyzing unit 220, an obtaining unit 501, a detecting unit 502, an identifying unit 503, a searching unit 504, a first calculating unit 505, a second calculating unit 506, a counting unit 507, and an output unit 508.

These functions (capture unit 210, message analyzing unit 220, and obtaining unit 501 to output unit 508) serving as a control unit may be realized by allowing the CPU 401 to execute a program stored in a storage area, such as the ROM 402, RAM 403, magnetic disk 405, or optical disk 407 illustrated in FIG. 4, or by the I/F 409, for example. Also, the functions of the units at connected ends indicated by arrows in FIG. 5 are realized by reading data output from the functions at connected sources from the storage area and by allowing the CPU 401 to execute the program related to the functions.

The obtaining unit 501 obtains a message data group which includes a message ID, a protocol, a type of message, and a transmission time of each message transmitted/received among the computer apparatuses (e.g., web server 102, AP server 103, DB server 104, and client terminal 105) in the network system 100 where a hierarchical structure of protocols is defined.

The hierarchical structure of protocols may be defined in the system in advance. Alternatively, hierarchical structure definition information (see FIG. 6) may be input by a user by operating the keyboard 410 or the mouse 411 illustrated in FIG. 4. When the hierarchical structure definition information is input, the hierarchical structure definition information is obtained by the obtaining unit 501, and the hierarchical structure of protocols is defined.

The message data group may be obtained by extracting from a message DB 700 (see FIG. 7) that stores analysis results generated by the message analyzing unit 220. Alternatively, the message data group may be directly input to the system analyzing apparatus 101 by a user by operating the keyboard 410 or the mouse 411 illustrated in FIG. 4, or may be obtained from an external computer apparatus.

Here, the capture unit 210 captures packets transmitted/received among the computer apparatuses in the system via the switches provided in the system (e.g., the switches S1 to S3 illustrated in FIG. 2). The message analyzing unit 220 analyzes a message in a packet captured by the capture unit 210.

The message analyzing unit 220 reconfigures message data transmitted/received among the computer apparatuses in the system by using the packet data 300-1 to 300-*m* stored in the packet DB 230. The message analyzing process of analyzing packets and reconfiguring a message is a known art, and thus the description thereof is omitted here (e.g., see Japanese Laid-open Patent Publication No. 2006-11683).

Figure 6:
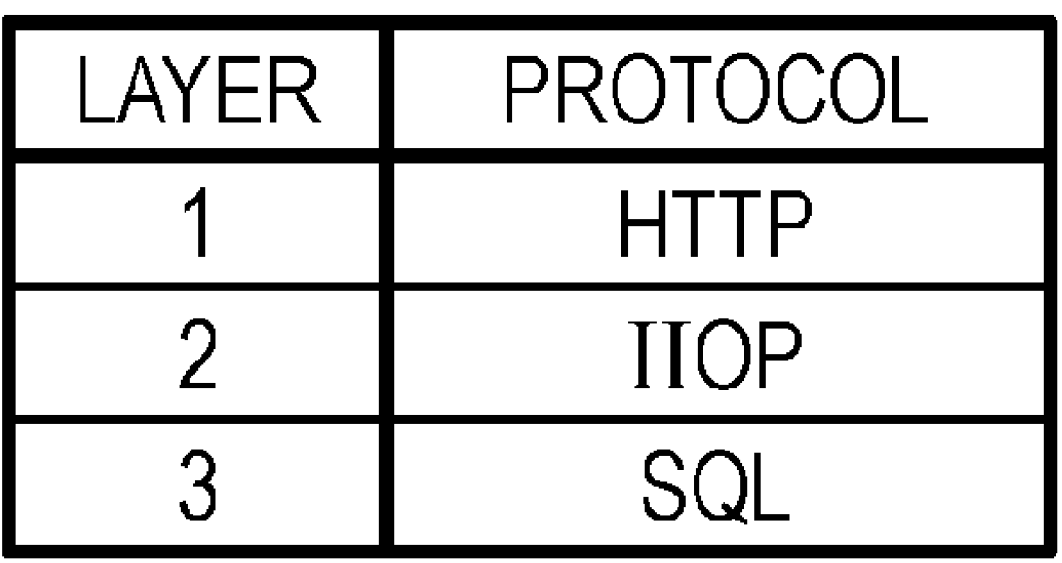
FIG. 6 illustrates an example of hierarchical structure definition information.

Now, the hierarchical structure definition information defining the hierarchical structure of protocols is described. FIG. 6 illustrates an example of the hierarchical structure definition information. Referring to FIG. 6, the hierarchical structure of protocols of the network system 100 is defined in the hierarchical structure definition information 600. For example, "HTTP" is defined in the first layer as the highest layer, "IIOP" is defined in the second layer, and "SQL" is defined in the third layer as the lowest layer.

Next, the content stored in the message DB 700, which stores analysis results generated by the message analyzing unit 220, is described. FIG. 7 illustrates the content stored in the message DB 700. Referring to FIG. 7, the message DB 700 stores message data 700-1 to 700-16 transmitted/received among the computer apparatuses in the network system 100. FIG. 7 illustrates part of the message data transmitted/received among the computers.

The message data 700-1 to 700-16 includes information about a message ID, a transmission time (e.g., hour: minute: second), a protocol, a type of message, and a URL. The message ID is an identifier to identify the message. The transmission time is the time when the message is transmitted. The type of message is information to indicate whether the message is a request message or a response message. The URL is designated by the browser installed in the client terminal 105. The URL is included only in a request message transmitted/received with the use of the protocol in the highest layer (e.g., the message data 700-1).

For example, the fact that a request message having a message ID "S2" was transmitted from the AP server 103 to the DB server 104 by using SQL (third layer) at the transmission time "00:00:00.012" can be recognized from the message data 700-8. The source and destination computer apparatuses can be identified on the basis of the protocol and the type of message. For example, when the protocol is "HTTP" and when the type of message is "request", the source computer apparatus is the client terminal 105 whereas the destination computer apparatus is the web server 102.

Referring back to FIG. 5, the detecting unit 502 detects pairs of a request message and a response message of the same message ID from the message data group obtained by the obtaining unit 501. The detecting unit 502 detects arbitrary message data from the message data group.

On the basis of the message ID of the detected message data, the detecting unit 502 searches the message data group for message data of the same message ID. If message data of the same message ID is found, the message data is identified.

Accordingly, a pair of a request message and a response message of the same message ID may be detected. The above-described procedure is repeatedly performed until there is no message data undetected in the message data group, so that all the pairs are detected in the message data group.

For example, assume that the message data 700-1 is detected in the message data 700-1 to 700-16. In this case, the searching unit searches for the message data of the message ID "H1" in the remaining message data 700-2 to 700-16. Then, a pair of a request message and a response message of the message ID "H1" is detected in the message data 700-14.

The identifying unit 503 identifies the request time and the response time of each pair detected by the detecting unit 502. In each pair, the transmission time of the request message is identified as the request time, and the transmission time of the response message is identified as the response time.

For example, in the pair of the message ID "H1," the transmission time "00:00:00.000" in the message data 700-1 is identified as the request time, whereas the transmission time "00:00:00.024" in the message data 700-14 is identified as the response time.

Now, a pair information table to store processing results generated by the detecting unit 502 and the identifying unit 503 is described. FIG. 8 illustrates an example of the pair information table. Referring to FIG. 8, the pair information table 800 includes pair information 800-1 to 800-8 of pairs P1 to P8 detected in the message data 700-1 to 700-16 illustrated in FIG. 7.

Each of the pair information 800-1 to 800-8 of the pairs P1 to P8 includes information about a pair ID, a message ID, a layer, a request time, and a response time. The "pair ID" is an identifier to identify the pair. The "message ID" is a unique message ID of the pair. The "layer" indicates the protocol unique to the pair. The "request time" and the "response time" represent a request time and a response time of the pair.

For example, the pair information 800-4 includes the pair ID "P4", the message ID "H2", the layer "first layer (HTTP)", the request time "00:00:00.007", and the response time "00:00:00.027".

Referring back to FIG. 5, the searching unit 504 searches for a child-layer pair on the basis of the identification result generated by the identifying unit 503. The child-layer pair means a pair that has a request time and a response time between the request time and the response time of a pair arbitrarily selected from among the pairs detected by the detecting unit 502 (hereinafter referred to as a "parent-layer pair"), and that has a protocol of a layer lower than the protocol of the parent-layer pair.

By referring to the pair information table 800 illustrated in FIG. 8, the searching unit 504 may search for a child-layer pair that has a request time and a response time between the request time and the response time of a parent-layer pair arbitrarily selected from among the pairs P1 to P8 and that has a protocol in the layer immediately under the protocol of the parent-layer pair.

At this time, a pair may be arbitrarily selected as a parent-layer pair from among the pairs P1, P2, P4, P5, and P7, but is not selected from among the pairs P3, P6, and P8 having the protocol in the lowest layer. Accordingly, a wasteful process of searching for a pair in the layer lower than the lowest layer (non-existing pair) can be reduced.

Now, an outline of the searching process performed by the searching unit 504 is described. Here, a description is given about a searching process of searching for a child-layer pair that has a request time and a response time between the request time and the response time of a parent-layer pair arbitrarily selected from among the pairs P1 to P8, and that has a protocol of the layer immediately under the protocol of the parent-layer pair, with reference to the pair information table 800.

Figure 9:
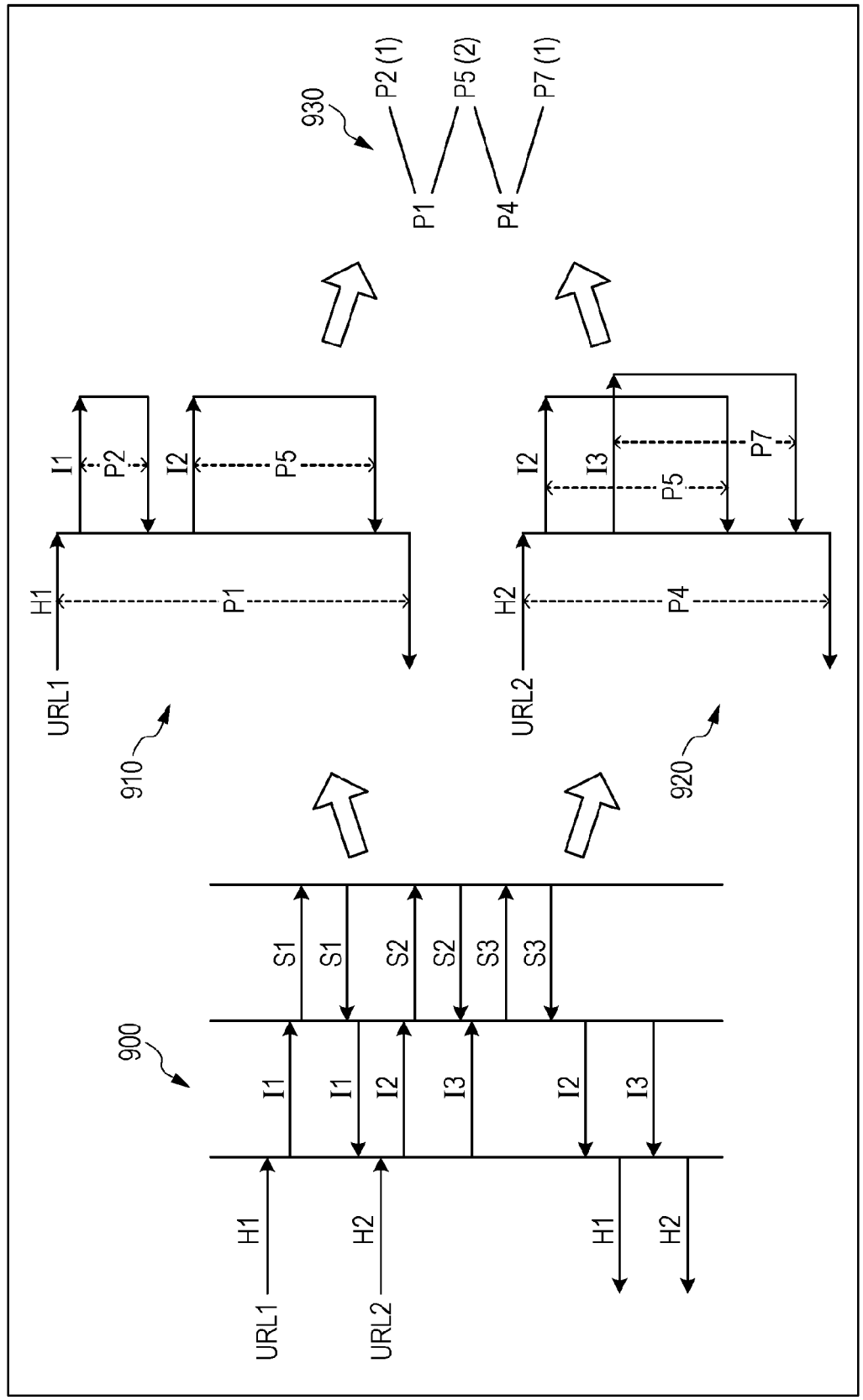
FIG. 9 illustrates an outline of a searching process.

FIG. 9 illustrates the outline of the searching process. FIG. 9 includes a sequence graph 900 showing a time-series flow of messages among the computer apparatuses in the network system 100. In FIG. 9, right-pointing arrows indicate request messages, whereas left-pointing arrows indicate response messages. Also, message IDs of the respective messages are indicated above the respective arrows.

The sequence graph 900 illustrates a time-series flow of all the messages identified in the message data 700-1 to 700-16. Also, URL1 and URL2 designated by the browser installed in the client terminal 105 are shown in the request messages in the highest layer (first layer).

The searching unit 504 arbitrarily selects parent-layer pairs P1 and P4 in the highest layer from among the pairs P1 to P8 with reference to the pair information table 800. The searching unit 504 searches for child-layer pairs that have a request time and a response time between the request time and the response time of the selected parent-layer pairs P1 and P4, and that have a protocol (IIOP) in the layer immediately under the protocol (HTTP) of the parent-layer pairs P1 and P4.

The searching unit 504 searches for and finds the child-layer pairs P2 and P5 in the second layer that have a request time and a response time between the request time "00:00:00.000" and the response time "00:00:00.024" of the parent-layer pair P1 in the first layer. As a result, parent-child relationships between the parent-layer pair P1 in the first layer and the child-layer pairs P2 and P5 in the second layer are analyzed (see graph 910).

Here, the parent-child relationship means a call relationship where a process request to a computer apparatus of a protocol in a lower layer (e.g., AP server 103) occurs in accordance with a process request to a computer apparatus of a protocol in a higher layer (e.g., web server 102).

In the graph 910, the request times and the response times of the pairs P2 and P5 are between the request time and the response time of the pair P1. Thus, parent-child relationships between the parent-layer pair P1 and the child-layer pairs P2 and P5 are formed. The child-layer pairs P2 and P5 are candidate pairs having a call relationship with the parent-layer pair P1. This is because each of the child-layer pairs P2 and P5 can form a parent-child relationship with a parent-layer pair other than the parent-layer pair P1.

Likewise, the searching unit 504 finds the child-layer pairs P5 and P7 in the second layer that have a request time and a response time between the request time "00:00:00.007" and the response time "00:00:00.027" of the parent-layer pair P4 in the first layer. As a result, parent-child relationships between the parent-layer pair P4 in the first layer and the child-layer pairs P5 and P7 in the second layer are analyzed (see graph 920).

In the graph 920, the request times and the response times of the pairs P5 and P7 are between the request time and the response time of the pair P4, which forms parent-child relationships between the parent-layer pair P4 and the child-layer pairs P5 and P7. In this case, the child-layer pair P5 forms parent-child relationships with both the parent-layer pairs P1 and P4, and is thus a candidate pair that forms call relationships with both the parent-layer pairs P1 and P4.

Although not illustrated, after the search for the parent-layer pairs P1 and P4 in the first layer ends, the process shifts to the second layer under the first layer, parent-layer pairs P2, P5, and P7 in the second layer are arbitrarily selected from among the pairs P1 to P8, and the respective parent-child relationships are analyzed. The series of processes are repeated until there is no unselected pair in all the layers except the lowest layer (e.g., third layer).

Accordingly, parent-child relationships between adjoining layers can be analyzed. A graph 930 depicts parent-child relationships between the parent-layer pairs in the first layer and the child-layer pairs in the second layer. The number attached to the child-layer pairs P2, P5, and P7 is the number of candidate parent-layer pairs having a call relationship.

The number of candidate parent-layer pairs having a call relationship with the respective child-layer pairs is counted by the counting unit 507 on the basis of the search result generated by the searching unit 504. Here, the child-layer pair P5 has parent-child relationships with both the parent-layer pairs P1 and P4, and thus the number of candidate parent-layer pairs having a call relationship is 2.

Figure 10:
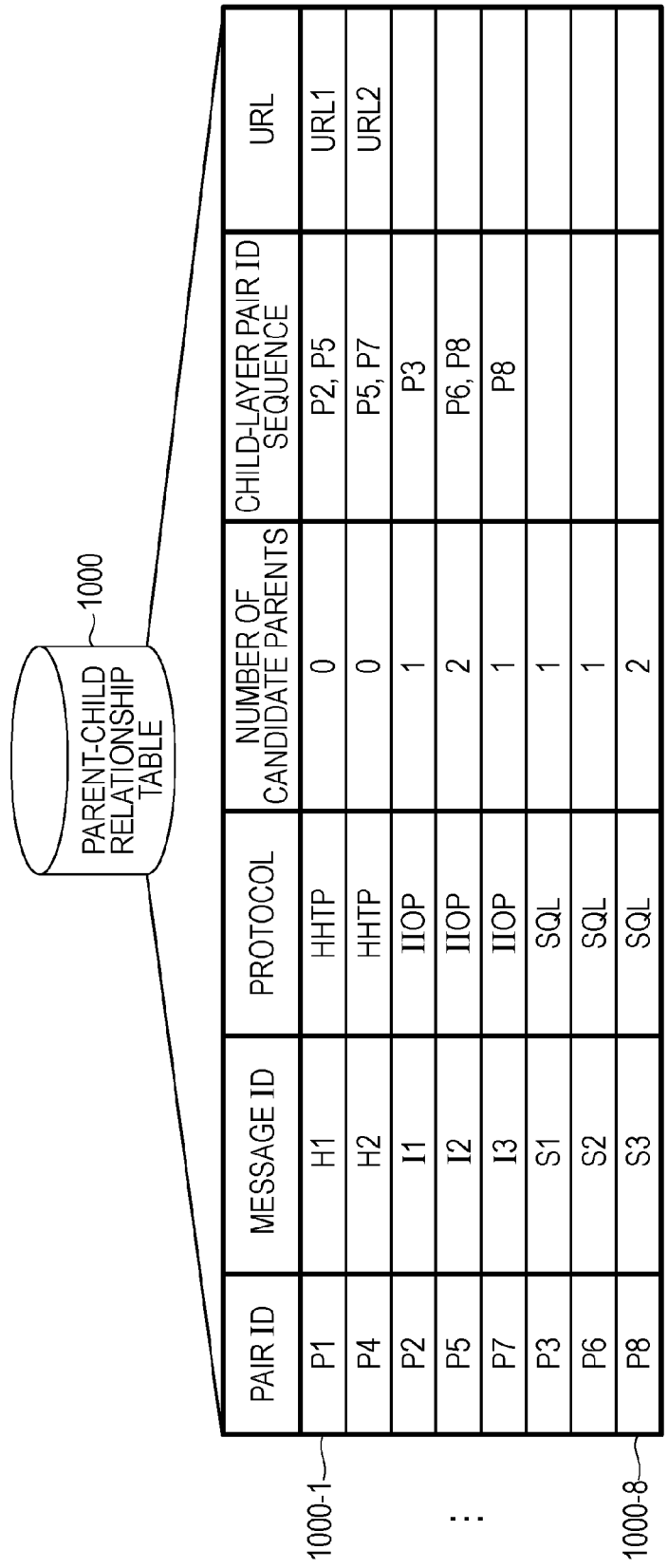
FIG. 10 illustrates content stored in a parent-child relationship table.

Now, a parent-child relationship table storing the search results generated by the searching unit 504 is described. FIG. 10 illustrates content stored in the parent-child relationship table. Referring to FIG. 10, the parent-child relationship table 1000 stores parent-child information 1000-1 to 1000-8 of the pairs P1 to P8.

Each of the parent-child information 1000-1 to 1000-8 of the pairs P1 to P8 has information about a pair ID, message ID, a protocol, the number of candidate parents, a child-layer pair ID sequence, and a URL. Here, the number of candidate parents is the number of candidate parent-layer pairs having a call relationship. The child-layer pair ID sequence indicates the pair ID of one or more child-layer pairs having a call relationship.

For example, the parent-child information 1000-1 of the pair P1 illustrated in FIG. 9 has information of the message ID "H1", the number of candidate parents "0" (because the pair P1 is in the highest layer), the child-layer pair ID sequence "P2, P5", and the URL "URL1" designated by the browser installed in the client terminal 105.

By referring to the parent-child relationship table 1000, a search for progeny-layer pairs from pairs in the highest layer to pairs in the lowest layer may be conducted. On the basis of the child-layer pair ID sequence of a parent-layer pair in the highest layer, a search for a child-layer pair may be conducted. Similarly, a search for a grandchild-layer pair may be conducted based on the child-layer pair ID sequence of the child-layer pair.

Figures 11, 12:
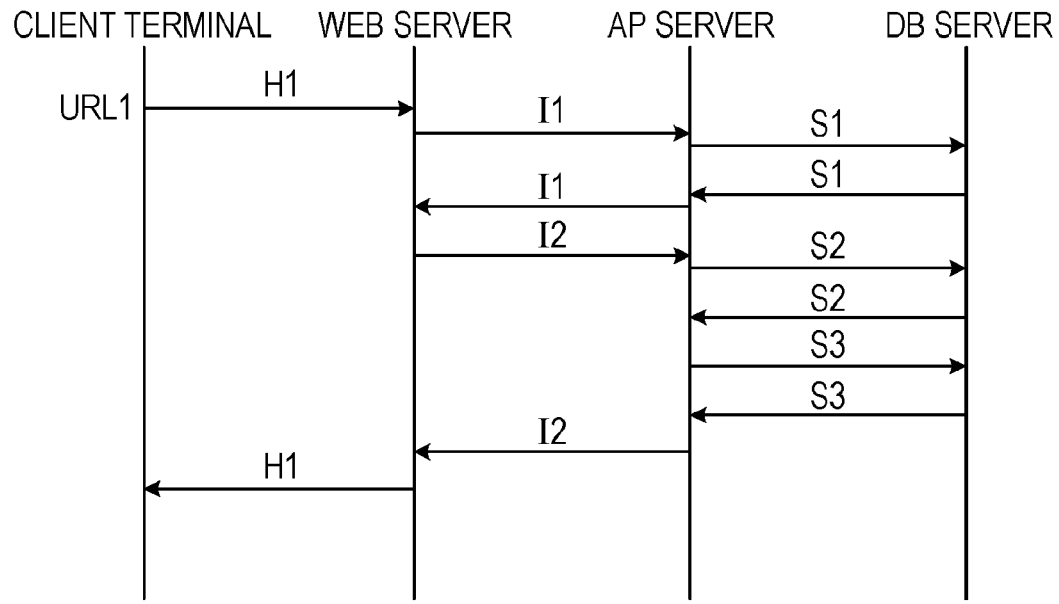
FIG. 11 illustrates an example of a transaction model.
FIG. 12 illustrates an example of a response period table.

The output unit 508 outputs the child-layer pairs found by the searching unit 504 as candidate pairs having a call relationship with a parent-layer pair. The output unit 508 may search for call relationships in the pairs in the highest layer to the lowest layer found by the searching unit 504, so as to output a transaction model representing the call relationships of messages from the highest layer to the lowest layer. FIG. 11 illustrates an example of the transaction model.

FIG. 11 illustrates a transaction model 1100 of a time-series flow of messages transmitted/received among the computer apparatuses in the network system 100. According to the transaction model 1100, a candidate message that is generated by the designation of "URL1" in the browser of the client terminal 105 can be identified.

Referring back to FIG. 5, the first calculating unit 505 calculates a response period from a request to a response of each of a parent-layer pair and a child-layer pair by using the request time and the response time of each pair identified by the identifying unit 503.

For example, the first calculating unit 505 can calculate the response period of each of the pairs P1 to P8 by calculating the difference between the request time and the response time of each of the pairs P1 to P8 by referring to the pair information table 800. For example, in the pair P1, the first calculating unit 505 can calculate the response period of the pair P1 (24 ms) by subtracting the request time from the response time of the pair information 800-1.

Now, a response period table storing the calculation results generated by the first calculating unit 505 is described. FIG. 12 illustrates an example of the response period table. In FIG. 12, the response period table 1200 shows the response period [ms] from a request to a response of each of the pairs P1 to P8.

The second calculating unit 506 calculates a processing period of a server that is a destination of a request message of a parent-layer pair on the basis of the response period of the parent-layer pair and the child-layer pair calculated by the first calculating unit 505. The second calculating unit 506 may calculate the processing period of the server that is a destination of the request message of the parent-layer pair by subtracting the response period of the child-layer pair from the response period of the parent-layer pair by referring to the parent-child relationship table 1000 and the response period table 1200.

At this time, when there is a plurality of candidate parents having a call relationship with the child-layer pair, the response period of the child-layer pair that is to be subtracted from the response period of the parent-layer pair is replaced with a value calculated by dividing the response period by the number of candidate parents. Accordingly, the response period of the child-layer pair is evenly allocated to the plurality of parent-layer pairs having a parent-child relationship.

That is, when there is a plurality of parent-layer pairs having a parent-child relationship, the parent-layer pair that actually has a call relationship is unknown. Thus, the value calculated by dividing the response period of the child-layer pair by the number of candidate parents is allocated to the respective parent-layer pairs, whereby the processing period of the above-described server is obtained.

Figure 13B:
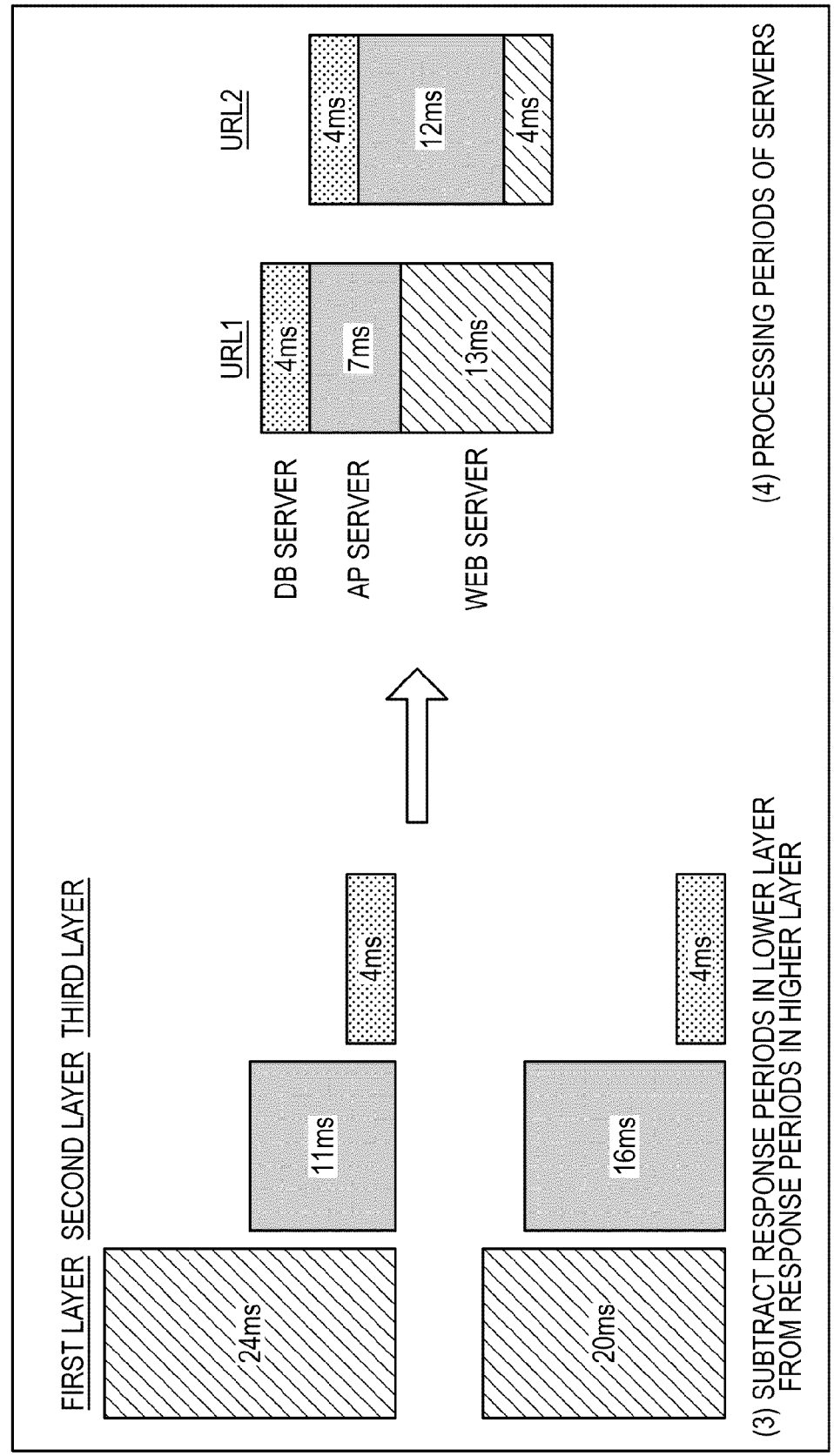
FIG. 13B illustrates an outline of the calculating process of calculating processing periods of servers.

Now, an outline of a calculating process of calculating a processing period of a server is described. FIGS. 13A and 13B illustrate the outline of the calculating process of calculating the processing period of the server. Here, assume that the progeny-layer pairs (child layer: second layer; grandchild layer: third layer) of the parent-layer pairs P1 and P4 in the first layer have been found on the basis of a search result generated by the searching unit 504.

Referring to FIG. 13A, the response periods in the third layer which is the lowest layer are allocated to the response periods in the second layer (1). The response period of the pair P3 in the third layer is allocated to the response period of the pair P2 in the second layer. Also, the response period of the pair P6 in the third layer is allocated to the response period of the pair P5 in the second layer. Since the pair P8 in the third layer has parent-child relationships with the pairs P5 and P7 in the second layer, the value calculated by dividing the response period of the pair 8 by 2 (the number of candidates) is allocated to each of the response periods of the pairs P5 and P7.

The response periods in the second layer are allocated to the response periods in the first layer (2). For example, the response period of the pair P2 in the second layer is allocated to the response period of the pair P1 in the first layer. Since the pair P5 in the second layer has parent-child relationships with the pairs P1 and P4 in the first layer, the value calculated by dividing the response period of the pair P5 by 2 (the number of candidates) is allocated to each of the response periods of the pairs P1 and P4. Also, the response period of the pair P7 in the second layer is allocated to the response period of the pair P4 in the first layer.

Referring to FIG. 13B, the response period in the lower layer is subtracted from the response period in the adjoining upper layer, whereby the processing period of the server that is a destination of the request message in the upper layer is calculated (3). The response period in the second layer is subtracted from the response period in the first layer, whereby the processing period of the web server 102 is calculated. Also, the response period in the third layer is subtracted from the response period in the second layer, whereby the processing period of the AP server 103 is calculated. Since the third layer is the lowest layer, the response period in the third layer corresponds to the processing period of the DB server 104.

Accordingly, the processing periods of the web server 102, the AP server 103, and the DB server 104 in the network system 100 can be calculated (4). For example, in "URL1", the processing period of the web server 102 is 13 ms, the processing period of the AP server 103 is 7 ms, and the processing period of the DB server 104 is 4 ms.

The output unit 508 outputs the processing periods of the respective servers calculated by the second calculating unit 506. The output unit 508 may output a table showing a list of processing periods of the respective servers (e.g., web server 102, AP server 103, and DB server 104) calculated by the second calculating unit 506.

Figures 14, 15:
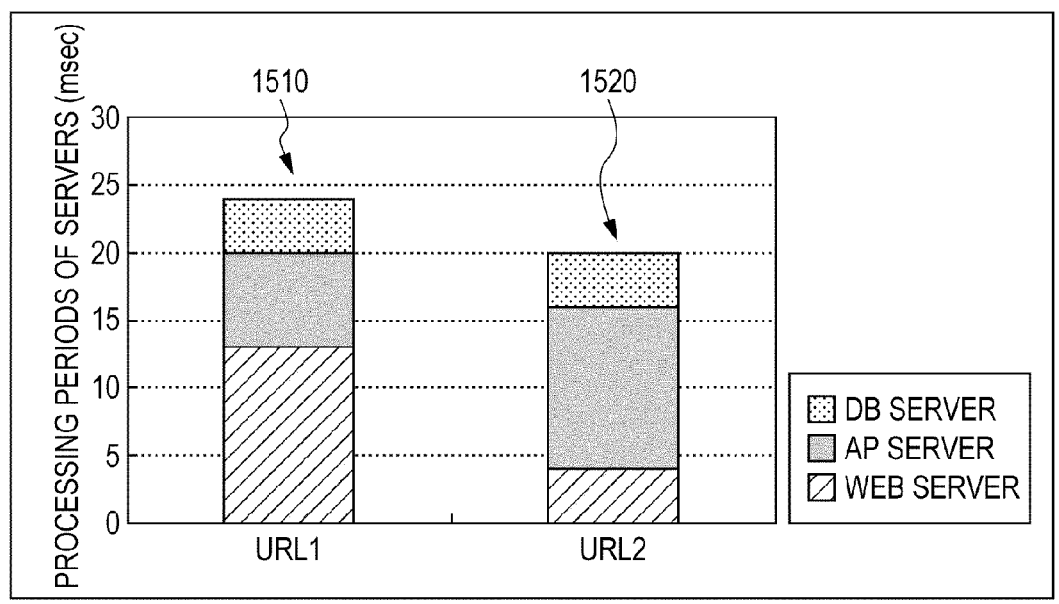
FIG. 14 illustrates a first example of an output result.
FIG. 15 illustrates a second example of the output result.

FIG. 14 illustrates a first example of an output result. Referring to FIG. 14, a processing period table 1400 shows a list of processing periods of the web server 102, the AP server 103, and the DB server 104 in the network system 100 for the URL1 and URL2. With this table, the processing periods of the web server 102, the AP server 103, and the DB server 104 when URL1 and URL2 are designated can be recognized.

Alternatively, the output unit 508 may display, on the display 408, a bar graph showing the details of the processing periods of the respective servers with respect to the entire processing period. FIG. 15 illustrates a second example of the output result.

FIG. 15 is a bar graph including bars 1510 and 1520 illustrating the details of the processing periods of the web server 102, the AP server 103, and the DB server 104 with respect to the entire processing period for URL1 and URL2. With this graph, the processing periods of the web server 102, the AP server 103, and the DB server 104 when URL1 and URL2 are designated may be intuitively recognized.

The output results illustrated in FIGS. 14 and 15 represent the processing periods when URL1 and URL2 are designated, and are thus estimated to have larger variations compared to actual processing periods. In such a case, errors may be reduced by arbitrarily designating a time slot to which a system analyzing process is applied and by calculating the average of the processing periods in the time slot (time unit).

In this case, the obtaining unit 501 obtains a message data group included in a designated time slot (e.g., "00:00:00.000" to "23:59:59.999"). As a result, a system analyzing process for the designated time slot is performed. The above-described time slot may be arbitrarily designated by a user by operating the keyboard 410 or the mouse 411 illustrated in FIG. 4.

The second calculating unit 506 may calculate an average processing period of the server that is a destination of a request message of the parent-layer pair in the arbitrarily designated time slot. For example, the second calculating unit 506 may calculate the average processing period of the respective servers by totaling the processing periods of the respective servers in the designated time slot (e.g., "00:00:00.000" to "23:59:59.999") for each URL and by calculating the average thereof. The URL can be identified from the request message of the protocol in the highest layer.

FIG. 16 illustrates a third example of the output result. Referring to FIG. 16, a processing period table 1600 shows a list of average processing periods of the web server 102, the AP server 103, and the DB server 104 in the network system 100 in each of URL1 to URLk.

With this table, statistical processing periods of the web server 102, the AP server 103, and the DB server 104 in an arbitrarily designated time slot can be recognized. As a result, for example, a server with a high load (web server 102 in this case) can be identified and the cause of degradation in performance may be quickly determined. Although not illustrated, a bar graph showing the output result illustrated in FIG. 16 may be displayed on the display 408 (see FIG. 15).

According to the embodiment, the capture unit 210 and the message analyzing unit 220 are provided in the system analyzing apparatus 101, but may be provided in an external computer apparatus. In that case, the obtaining unit 501 may obtain a message data group from the external computer apparatus.

(Procedure of System Analyzing Process in System Analyzing Apparatus)

Figure 17:
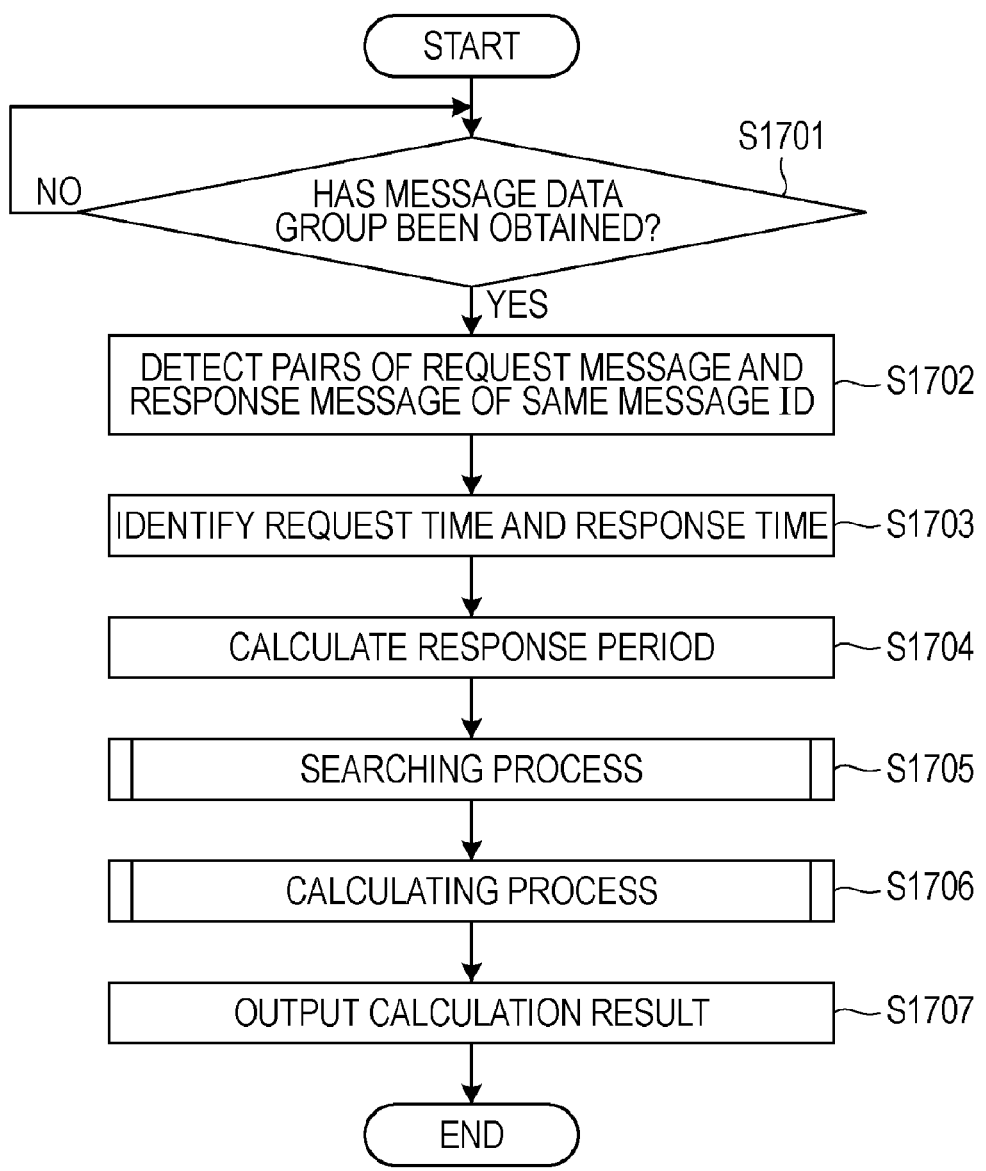
FIG. 17 is a flowchart illustrating an example of a procedure of a system analyzing process.

Hereinafter, a procedure of a system analyzing process performed in the system analyzing apparatus 101 according to the embodiment is described. FIG. 17 is a flowchart illustrating an example of the procedure of the system analyzing process. First, the obtaining unit 501 determines whether it has obtained a message data group transmitted/received among the computer apparatuses in the system (step S1701).

The obtaining unit 501 waits for the acquisition of a message data group (NO in step S1701). After the obtaining unit 501 has obtained a message data group (YES in step S1701), the detecting unit 502 detects pairs of a request message and a response message of the same message ID from the obtained message data group (step S1702).

The identifying unit 503 identifies the request time and the response time of each of the detected pairs on the basis of the transmission time in the message data (step S1703). The first calculating unit 505 calculates a response period from a request to a response of each of a parent-layer pair and a child-layer pair by using the identified request time and response time of each pair (step S1704).

On the basis of the identification result generated by the identifying unit 503, the searching unit 504 searches for a child-layer pair that has a request time and a response time between the request time and the response time of a parent-layer pair selected from among the pairs, and that has a protocol in a layer lower than the protocol of the parent-layer pair (step S1705).

The second calculating unit 506 calculates a processing period of a server that is a source of the request message of the parent-layer pair on the basis of the calculated response periods of the parent-layer pair and child-layer pair (step S1706). The output unit 508 outputs a calculation result (step S1707), and the process is completed.

Next, a procedure of the searching process in step S1705 illustrated in FIG. 17 is described. Hereinafter, in the hierarchical structure of protocols defined in the system, the highest layer is the first layer, the lowest layer is the N-th layer, and an arbitrarily selected layer is the n-th layer (n=1, 2, ..., N).

Figure 18:
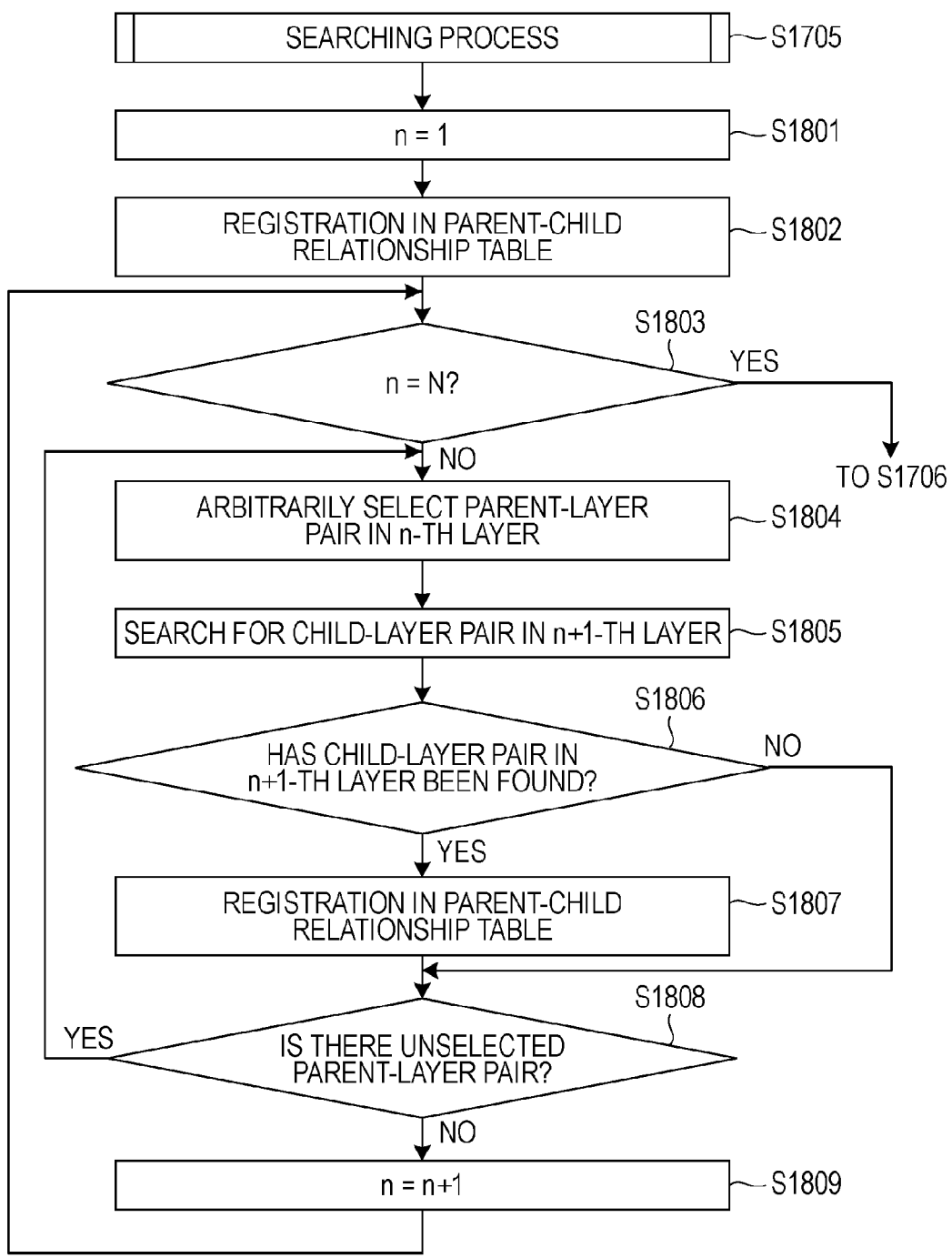
FIG. 18 is a flowchart illustrating a procedure of a searching process.

FIG. 18 is a flowchart illustrating a procedure of the searching process. The searching unit 504 sets n=1 (step S1801), and registers the pair ID, message ID, protocol, and URL of each pair in the n-th layer (n=1) in the parent-child relationship table (step S1802).

The searching unit 504 determines whether n=N (step S1803). If n≠N (NO in step S1803), the searching unit 504 arbitrarily selects a parent-layer pair in the n-th layer from among the pairs detected in step S1702 in FIG. 17 (step S1804). The searching unit 504 searches for a child-layer pair in the n+1-th layer that has a request time and a response time between the request time and the response time of the selected parent-layer pair (step S1805).

The searching unit 504 determines whether a child-layer pair in the n+1-th layer has been found (step S1806). If no child-layer pair in the n+1-th layer has been found (NO in step S1806), the process proceeds to step S1808.

On the other hand, if a child-layer pair in the n+1-th layer has been found (YES in step S1806), the searching unit 504 registers the pair ID of the found child-layer pair in the corresponding entry of the parent-layer pair in the parent-child relationship table and also registers the pair ID, the message ID, and the protocol of the child-layer pair in the parent-child relationship table (step S1807). At this time, if the pair ID, the message ID, and the protocol of the child-layer pair have already been registered, the counting unit 507 increases the number of candidate parents of the of the child-layer pair by 1.

The searching unit 504 determines whether there is an unselected parent-layer pair in the n-th layer from among the pairs (step S1808). If there is an unselected parent-layer pair (YES in step S1808), the process returns to step S1804, and the series of steps are repeated.

On the other hand, if there is no unselected parent-layer pair (NO in step S1808), the searching unit 504 sets n=n+1 (step S1809), and the process returns to step S1803. If n=N (YES in step S1803), the process shifts to step S1706 in FIG. 17.

Figure 19:
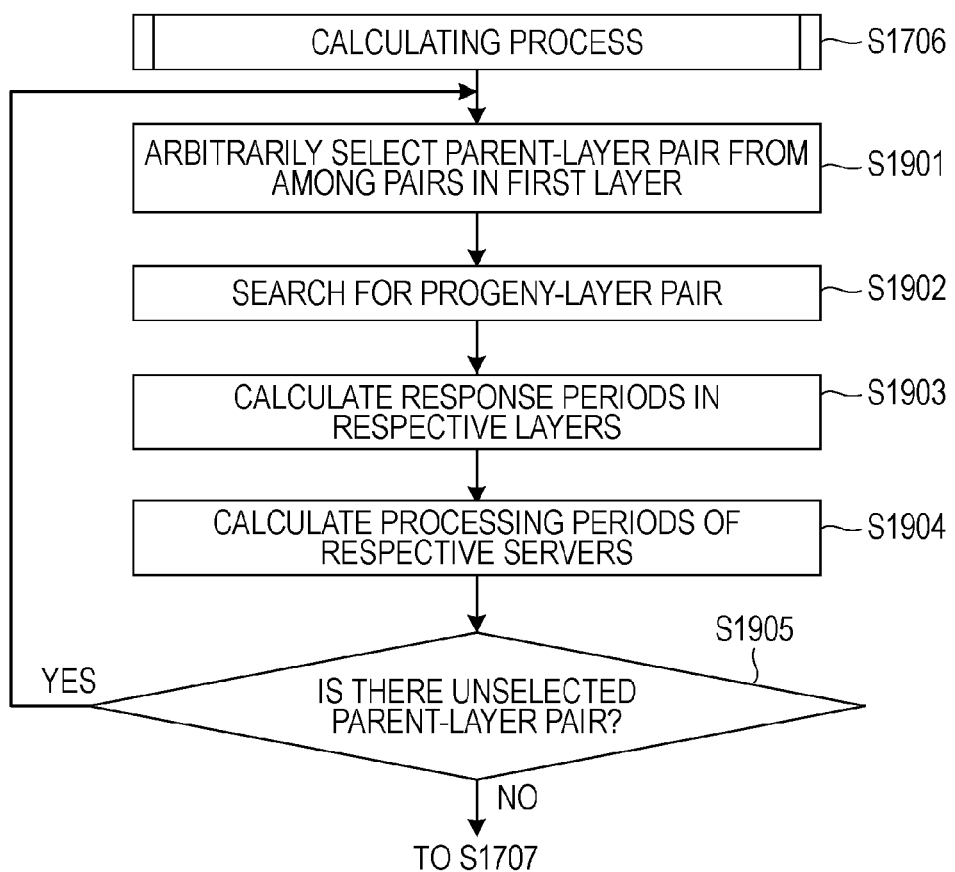
FIG. 19 is a flowchart illustrating a procedure of a calculating process.

Next, a procedure of the calculating process in step S1706 illustrated in FIG. 17 is described. FIG. 19 is a flowchart illustrating a procedure of the calculating process. First, the second calculating unit 506 arbitrarily selects a parent-layer pair in the first layer from among the pairs detected in step S1702 in FIG. 17 (step S1901).

The second calculating unit 506 searches for a progeny-layer pair of the selected parent-layer pair by referring to the child-layer pair ID sequence in the parent-child relationship table (step S1902). The second calculating unit 506 calculates the response periods in the respective layers by allocating the response periods in a lower layer to the response periods in an adjoining upper layer by referring to the response period table (step S1903).

The second calculating unit 506 calculates the processing periods of the respective servers by subtracting the response period in a lower layer from the response period in an adjoining upper layer (step S1904). The second calculating unit 506 determines whether there is an unselected parent-layer pair in the first layer from among the pairs (step S1905).

If there is an unselected parent-layer pair in the first layer (YES in step S1905), the process returns to step S1901, and the second calculating unit 506 repeats the process. On the other hand, if there is no unselected parent-layer pair in the first layer (NO in step S1905), the process shifts to step S1707 in FIG. 17.

As described above, according to the embodiment, one skilled in the art may analyze an operation status of each server in the system without creating a transaction model in advance. A parent-child relationship among messages can be analyzed from the message data group transmitted/received in the system, and the processing periods of the respective servers can be estimated on the basis of the analysis result and the response periods of the respective messages.

Accordingly, one skilled in the art can recognize the processing periods of the servers when the respective URLs are designated. Also, by totaling the processing periods of the servers of requests that occur in a certain time unit (e.g., in units of hours or in units of days) for each URL, an average processing period of each server for each URL can be statistically calculated, so that the accuracy of system analysis can be improved. As a result, a server with a high load and a server not operating may be identified, and thus the cause of a degradation in performance or a failure may be quickly determined.

Furthermore, specific information of messages transmitted/received in the system and the knowledge and know-how for creating a transaction model are not required, and thus introduction costs for system analysis can be reduced compared to the conventional system analysis.

Second Embodiment

Hereinafter, a system analyzing method according to a second embodiment is described. According to the above-described embodiment, in the case where a plurality of parent-layer pairs having a parent-child relationship with a child-layer pair exist, a value calculated by dividing the response period of the child-layer pairs by the number of candidate parents is assigned to the respective parent-layer pairs. This is a method for calculating the processing period of a server by evenly distributing the response period of the child-layer pairs to the respective parent-layer pairs because the child-layer pair that actually has a call relationship with each of the parent-layer pairs is not specified.

In the method according to the above-described embodiment, however, the processing period of the server is averaged among works (among different URLs), so that the accuracy of system analysis may be degraded. Particularly, the degradation in accuracy is more likely to be significant in the case where the details of the processing period of the server are significantly different among works or in the case where overlap of messages increases due to a heavier load imposed on the server. Note that the URL specified by the client terminal 105 corresponds to a work.

According to the second embodiment described below, in the case where a plurality of parent-layer pairs having a parent-child relationship with a child-layer pair exist, screening is performed to extract child-layer pairs that have a high possibility of actually having a call relationship with the parent-layer pairs, whereby the accuracy of system analysis is increased. Hereinafter, the illustration and description of the parts same as those described in the first embodiment are omitted.

Figure 20:
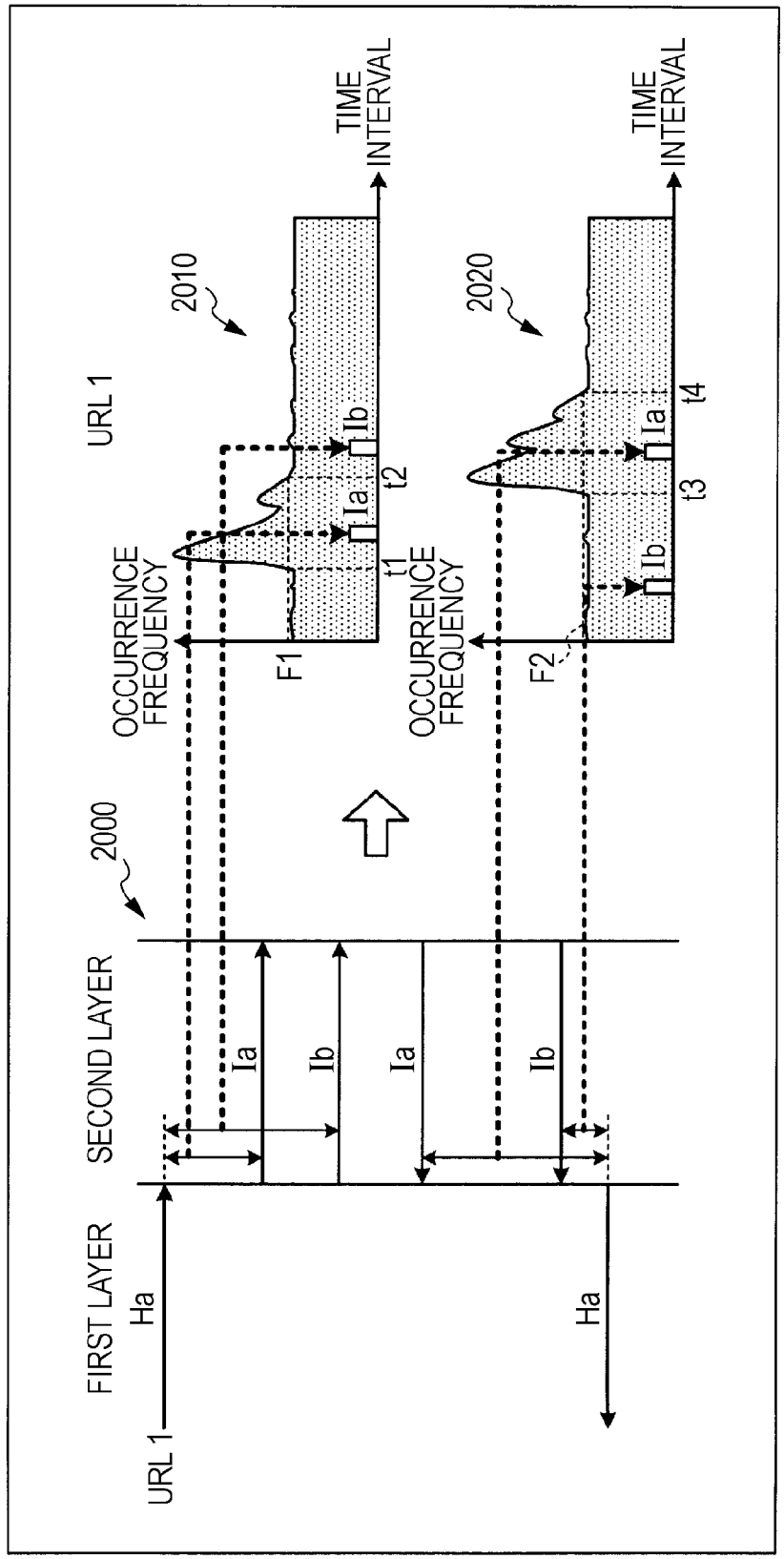
FIG. 20 illustrates a system analyzing method according to a second embodiment.

FIG. 20 illustrates the system analyzing method according to the second embodiment. Referring to FIG. 20, a sequence graph 2000 shows a flow of messages in first and second layers in time series. In FIG. 20, a right arrow indicates a request message, whereas a left arrow indicates a response message. A message ID of a message is assigned to each arrow.

A graph 2010 shows a frequency distribution indicating a relationship between a transmission time interval between request messages in the first and second layers and an occurrence frequency of request messages in the second layer. Here, the occurrence frequency means the number of transmission times of messages. In the graph 2010, an occurrence frequency "F1" represents an average occurrence frequency per unit time of request messages in the second layer (hereinafter referred to as "average frequency").

In the graph 2010, the occurrence frequency of request messages in the second layer from time t1 to time t2 is higher than the average frequency "F1". The request messages in the second layer include a request message that does not have a call relationship with a request message of URL 1.

A graph 2020 shows a frequency distribution indicating a relationship between a transmission time interval between response messages in the first and second layers and an occurrence frequency of response messages in the second layer. In the graph 2020, an occurrence frequency "F2" represents an average occurrence frequency per unit time of response messages in the second layer.

In the graph 2020, the occurrence frequency of response messages in the second layer from time t3 to time t4 is higher than the average frequency "F2". The response messages in the second layer include a response message that does not have a call relationship with a response message of URL 1.

In the second embodiment, a message in the range where the occurrence frequency of messages in the second layer is higher than the average frequency is regarded as a message that has a high possibility of having a call relationship with a message in the first layer. On the other hand, a message in the range where the occurrence frequency of messages in the second layer is lower than the average frequency is regarded as a message that has a low possibility of having a call relationship with a message in the first layer.

Specifically, among request messages Ia and Ib in the second layer, the request message Ia in the range from time t1 to time t2 is regarded as a message having a call relationship with a request message Ha in the first layer. On the other hand, among the request messages Ia and Ib in the second layer, the request message Ib out of the range from time t1 to time t2 is regarded as a message not having a call relationship with the request message Ha in the first layer.

Likewise, among response messages Ia and Ib in the second layer, the response message Ia in the range from time t3 to time t4 is regarded as a message having a call relationship with a response message Ha in the first layer. On the other hand, among the response messages Ia and Ib in the second layer, the response message Ib out of the range from time t3 to time t4 is regarded as a message not having a call relationship with the response message Ha in the first layer.

Then, screening is performed to extract a child-layer pair in which both the request and response messages are within the range as a child-layer pair having a call relationship with a parent-layer pair. In the example illustrated in FIG. 20, the child-layer pair of the message ID "Ia" among the child-layer pairs of the message IDs "Ia" and "Ib" is extracted as a child-layer pair having a call relationship with the parent-layer pair of the message ID "Ha". On the other hand, the child-layer pair of the message ID "Ib" is eliminated as a child-layer pair not having a call relationship with the parent-layer pair of the message ID "Ha".

As described above, in the system analyzing method according to the second embodiment, a child-layer pair that has a high possibility of actually having a call relationship with a parent-layer pair can be specified. Accordingly, a response period of child-layer pairs can be appropriately distributed to parent-layer pairs, averaging of the processing period of the server among works is suppressed, whereby the accuracy of system analysis can be increased.

(Functional Configuration of System Analyzing Apparatus)

Figure 21:
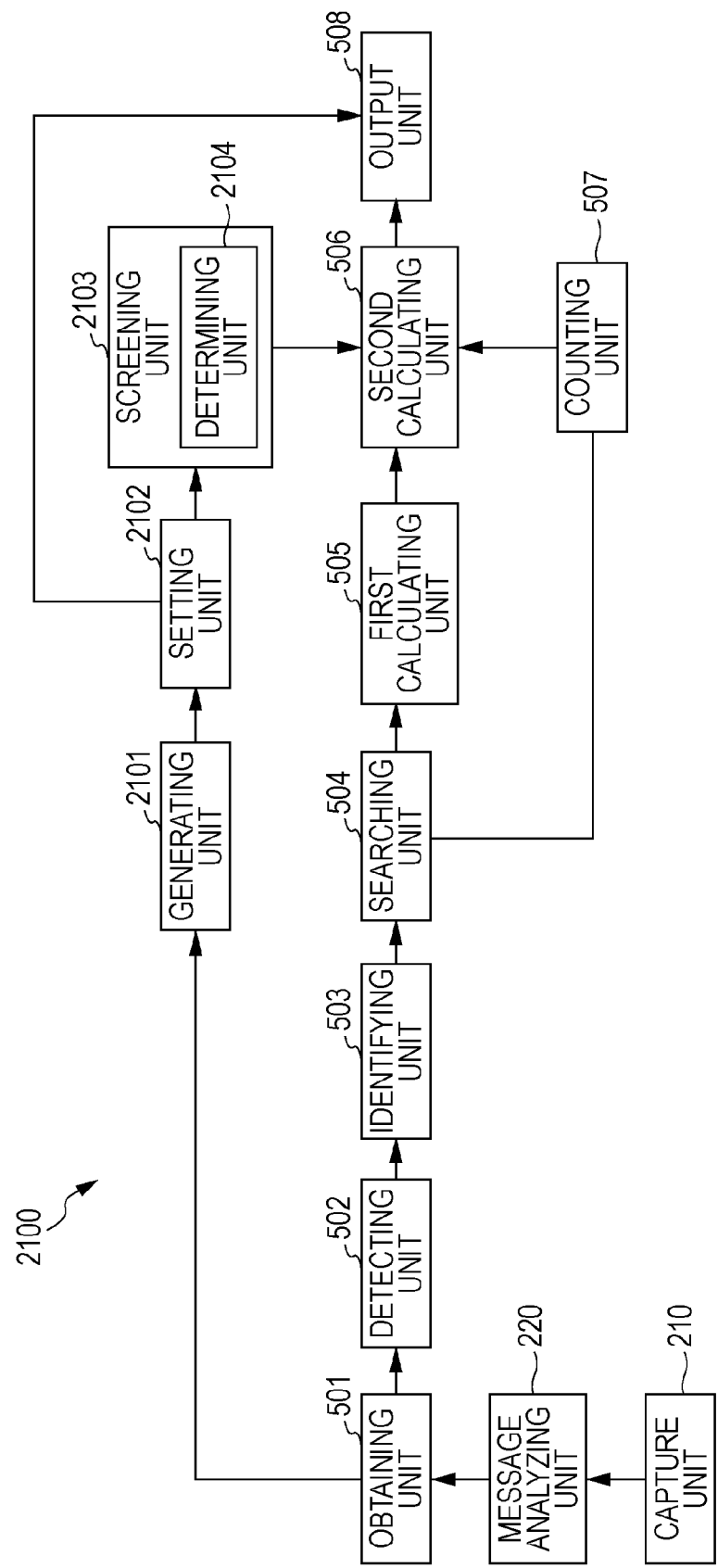
FIG. 21 is a block diagram illustrating a functional configuration of a system analyzing apparatus according to the second embodiment.

Hereinafter, a functional configuration of a system analyzing apparatus according to the second embodiment is described. FIG. 21 is a block diagram illustrating a functional configuration of the system analyzing apparatus according to the second embodiment. The system analyzing apparatus 2100 includes a capture unit 210, a message analyzing unit 220, an obtaining unit 501, a detecting unit 502, an identifying unit 503, a searching unit 504, a first calculating unit 505, a second calculating unit 506, a counting unit 507, an output unit 508, a generating unit 2101, a setting unit 2102, a screening unit 2103, and a determining unit 2104.

The function serving as a control unit (capture unit 210, message analyzing unit 220, obtaining unit 501 to output unit 508, generating unit 2101 to determining unit 2104) is realized by allowing the CPU 401 to execute a program stored in a storage area, such as the ROM 402, RAM 403, magnetic disk 405, or optical disk 407 illustrated in FIG. 4, or by the I/F 409. The function of each unit indicated by an arrow in FIG. 21 is realized by reading output data from the function in the preceding stage from the storage area and allowing the CPU 401 to execute the program about the corresponding function.

The generating unit 2101 has a function of generating a frequency distribution indicating a relationship between a transmission time interval between messages of the same type in upper and lower layers adjacent to each other and an occurrence frequency of messages in the lower layer on the basis of a message data group. The message data group is, for example, the message data 700-1 to 700-16 illustrated in FIG. 7. Note that the message data group is that in the case where the load in the respective servers slightly changes.

Specifically, the generating unit 2101 generates, for each URL, a request frequency distribution indicating a relationship between a transmission time interval between request messages in the first and second layers and an occurrence frequency of request messages in the second layer. Also, the generating unit 2101 generates, for each URL, a response frequency distribution indicating a relationship between a transmission time interval between response messages in the first and second layers and an occurrence frequency of response messages in the second layer.

The generated result is stored in a storage area, such as the RAM 403, magnetic disk 405, or optical disk 407 illustrated in FIG. 4. Now, a description is given about a specific process of generating the request frequency distribution by the generating unit 2101.

Figure 22:
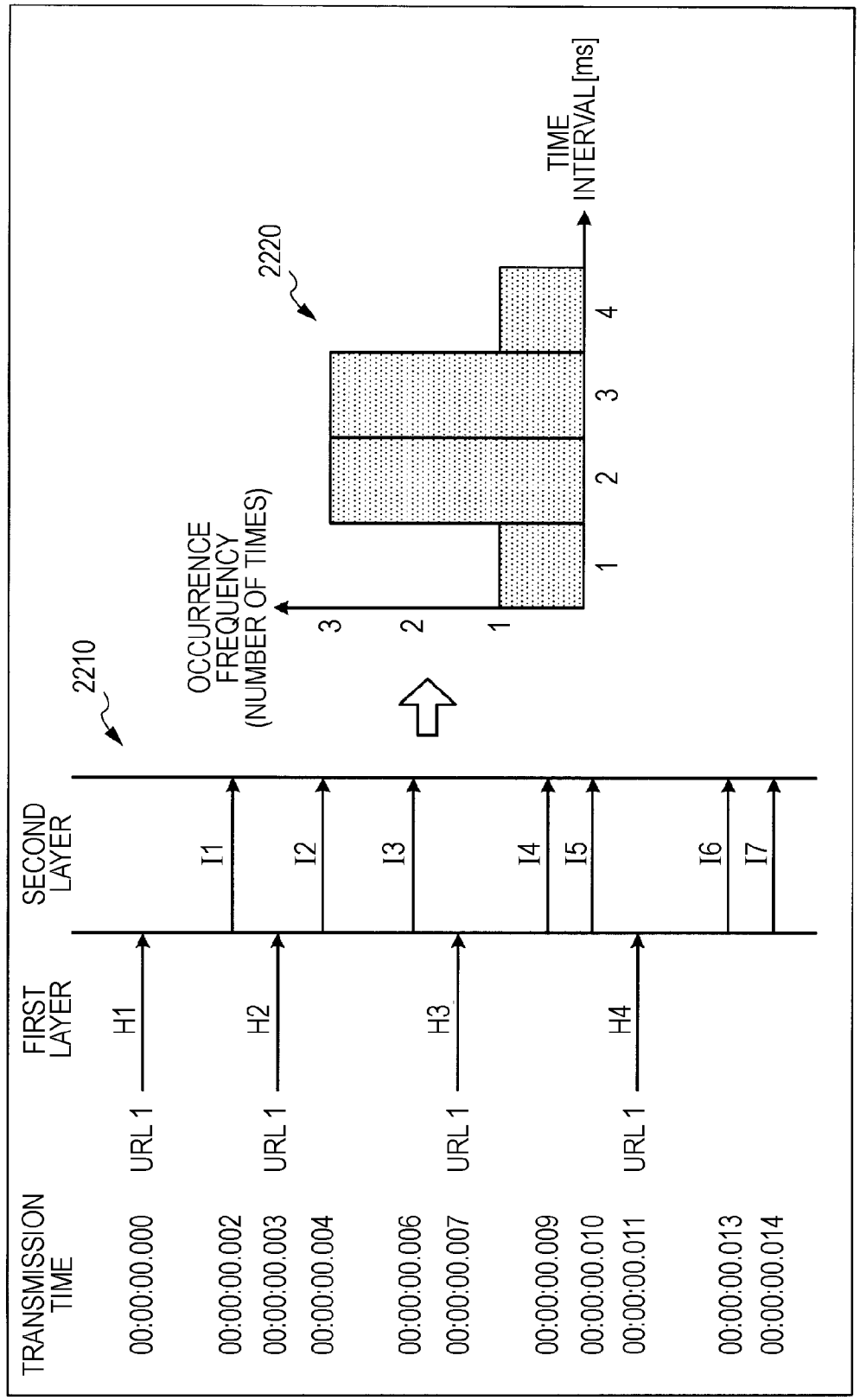
FIG. 22 illustrates an example of generating a request frequency distribution.

FIG. 22 illustrates an example of generating the request frequency distribution. Referring to FIG. 22, a sequence graph 2210 shows a flow of request messages in the first and second layers in time series. Note that, as request messages in the first layer, only request messages in the case where URL 1 is specified are illustrated. The transmission times shown on the left of the sequence graph 2210 are the transmission times of the respective request messages.

First, the generating unit 2101 selects a message H1 from the message data group on the basis of URL 1. Then, the generating unit 2101 calculates the transmission time interval between the selected message H1 and each of messages I1 to I7 in the second layer transmitted after the transmission time of the message H1. For example, the transmission time interval between the message H1 and the message I1 is 2 ms.

Then, the generating unit 2101 selects an unselected message H2 from the message data group on the basis of URL 1. Then, the generating unit 2101 calculates the transmission time interval between the selected message H2 and each of the messages I2 to I7 in the second layer transmitted after the transmission time of the message H2. For example, the transmission time interval between the message H2 and the message I2 is 1 ms.

Likewise, the generating unit 2101 calculates the transmission time interval between messages for the messages H3 and H4 in the first layer. Then, the generating unit 2101 calculates the occurrence frequency of request messages in the second layer at predetermined time intervals (e.g., at the intervals of 1 ms) on the basis of the calculated transmission time intervals between the messages.

Then, the generating unit 2101 generates a request frequency distribution 2220 by sorting the calculated occurrence frequencies of the predetermined time intervals in time series. The request frequency distribution 2220 is a histogram showing a relationship between a transmission time interval between request messages in the first and second layers and an occurrence frequency of request messages in the second layer. In FIG. 22, only part of the request frequency distribution 2220 is illustrated.

Here, assume that a time interval between messages is "t" ms. According to the request frequency distribution 2220, the occurrence frequency in the range "$0.5 \leq t \leq 1.5$" is 1 (once), and the occurrence frequency in the range "$1.5 \leq t \leq 2.5$" is 3 (three times). The occurrence frequency in the range "$2.5 \leq t \leq 3.5$" is 3 (three times), and the occurrence frequency in the range "$3.5 \leq t \leq 4.5$" is 1 (once).

Referring back to FIG. 21, the setting unit 2102 has a function to set a range regarding the transmission time of a message in a lower layer having a call relationship with a message in an upper layer on the basis of the generated frequency distribution.

Specifically, the setting unit 2102 sets, for each URL, a screening range to extract a request message in the second layer (hereinafter referred to as "request screening range") having a call relationship with a request message in the first layer on the basis of the request frequency distribution. Also, the setting unit 2102 sets, for each URL, a screening range to extract a response message in the second layer (hereinafter referred to as "response screening range) having a call relationship with a response message in the first layer on the basis of the response frequency distribution.

Now, a description is given about a specific example of a process of setting the request screening range by the setting unit 2102. First, the setting unit 2102 calculates an average occurrence frequency (hereinafter referred to as "average frequency") per unit time of request messages in the second layer by using the message data group. The unit time is the above-described predetermined period (e.g., 1 ms).

More specifically, the average frequency can be calculated by using the following expression (1). "F" represents an average occurrence frequency of request messages (or response messages). "T" represents an aggregation period of message data. "n" represents the number of request messages (or response messages) in the second layer transmitted/received between computer apparatuses in the system during the aggregation period "T". "C" represents the number of times URL i (i=1, 2, . . . , k) is specified during the aggregation period "T".

$$F = n/T \times C \tag{1}$$

In the example illustrated in FIG. 22, the number of request messages "n" is 7, the aggregation period "T" of message data is 14, and the number of times "C" URL 1 is specified during the aggregation period "T" is 4. Therefore, the average occurrence frequency "F" of request messages is $7/14 \times 4 = 2$ (twice/ms).

Then, the setting unit 2102 specifies a range where the occurrence frequency of request messages in the second layer is the average or more with reference to the request frequency distribution. Then, the setting unit 2102 sets the specified range as a request screening range. In the example illustrated in FIG. 22, the setting unit 2102 sets the range "$1.5 \leq t < 3.5$" where the occurrence frequency is the average frequency F (F=2 (twice/ms)) or more as a request screening range.

The number of screening ranges may be one or plural. For example, in the case where a plurality of ranges where the occurrence frequency is the average frequency F or more exist in the request frequency distribution 2220, a plurality of request screening ranges may be set. The set result is stored in the screening range table 2300 illustrated in FIG. 23, for example.

The above-described average frequency may be ±α in view of variations in frequency distribution. "α" can be arbitrarily set. For example, a user may set α by adjusting α on the basis of an actual measurement value in the state where a call relationship among all messages is clear.

Figure 23:
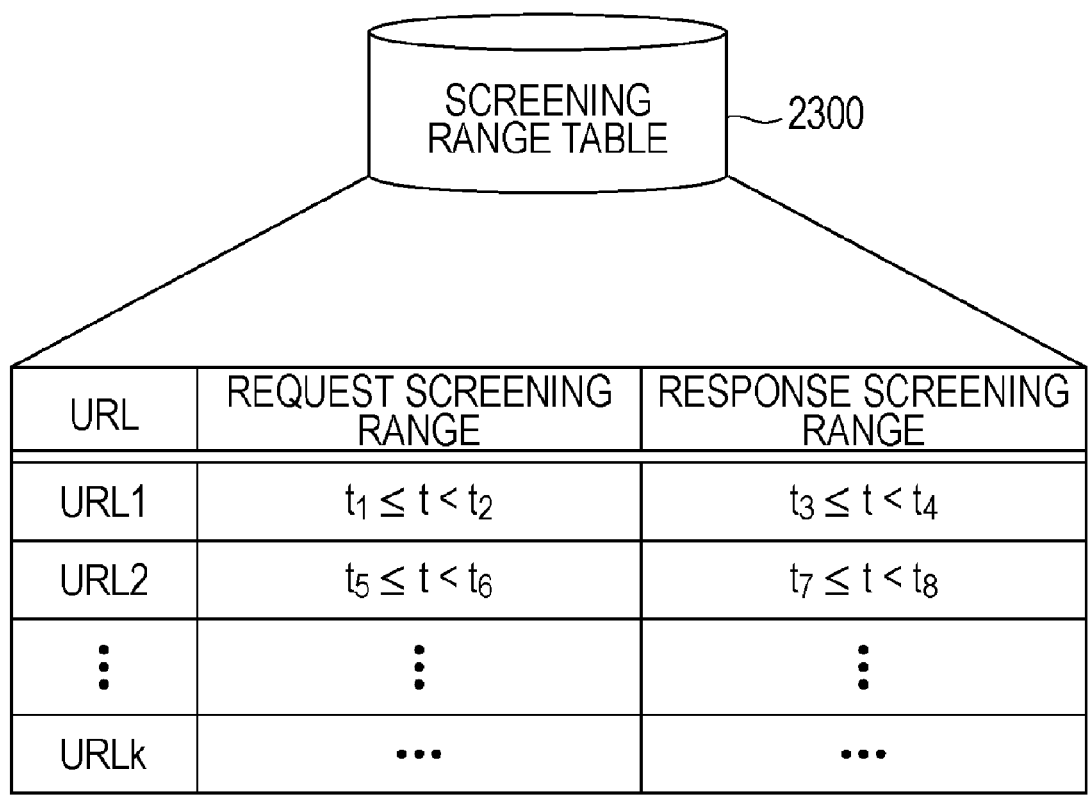
FIG. 23 illustrates an example of content stored in a screening range table.

FIG. 23 illustrates an example of content stored in the screening range table. Referring to FIG. 23, the screening range table 2300 includes fields of URL, a screening range of request messages, and a screening range of response messages. Information is set in each field, whereby screening ranges of respective URLs are stored as a record.

Here, "URL" is an address specified by a browser loaded in the client terminal 105. The request screening range is a range for extracting a request message in the second layer having a call relationship with a request message in the first layer. The response screening range is a range for extracting a response message in the second layer having a call relationship with a response message in the first layer.

For example, in URL 1, the request screening range is "$t_1 \leq t < t_2$", whereas the response screening range is "$t_3 \leq t < t_4$". According to the screening range table 2300, a message in the second layer having a high possibility of having a call relationship with a message in the first layer can be extracted. The output unit 508 may output the screening range table 2300 illustrated in FIG. 23, for example.

Referring back to FIG. 21, the screening unit 2103 has a function to screen child-layer pairs searched for by the searching unit 504 and extract a child-layer pair in a lower layer having a call relationship with a parent-layer pair in an upper layer on the basis of the set result. Specifically, the screening unit 2103 extracts, for each URL, a child-layer pair in the second layer having a call relationship with a parent-layer pair in the first layer with reference to the screening range table 2300.

Now, a specific example of a screening process for URL 1 performed by the screening unit 2103 is described. Assume that the request screening range of URL 1 is "$1.5 \leq t < 3.5$" and that the response screening range is "$2.5 \leq t < 4.5$". First, the screening unit 2103 selects a parent-layer pair P1 in the first layer of URL 1 with reference to the URL in the parent-child relationship table 1000.

Then, the screening unit 2103 arbitrarily selects a child-layer pair with reference to the child-layer pair ID sequence in the parent-child relationship table 1000. Here, assume that a child-layer pair P5 is selected. In this case, the screening unit 2103 calculates the time interval between the request time of the parent-layer pair P1 and the request time of the child-layer pair P5 with reference to the pair information table 800. Here, the time interval is 9 ms.

Then, the screening unit 2103 determines whether the calculated time interval (9 ms) is within the request screening range with reference to the screening range table 2300 on the basis of URL 1. Since the request screening range is "$1.5 \leq t < 3.5$", the time interval (9 ms) is out of the range. In this case, the screening unit 2103 eliminates the child-layer pair P5 from the child-layer pair ID sequence of the parent-layer pair P1 in the parent-child relationship table 1000.

Figure 24:
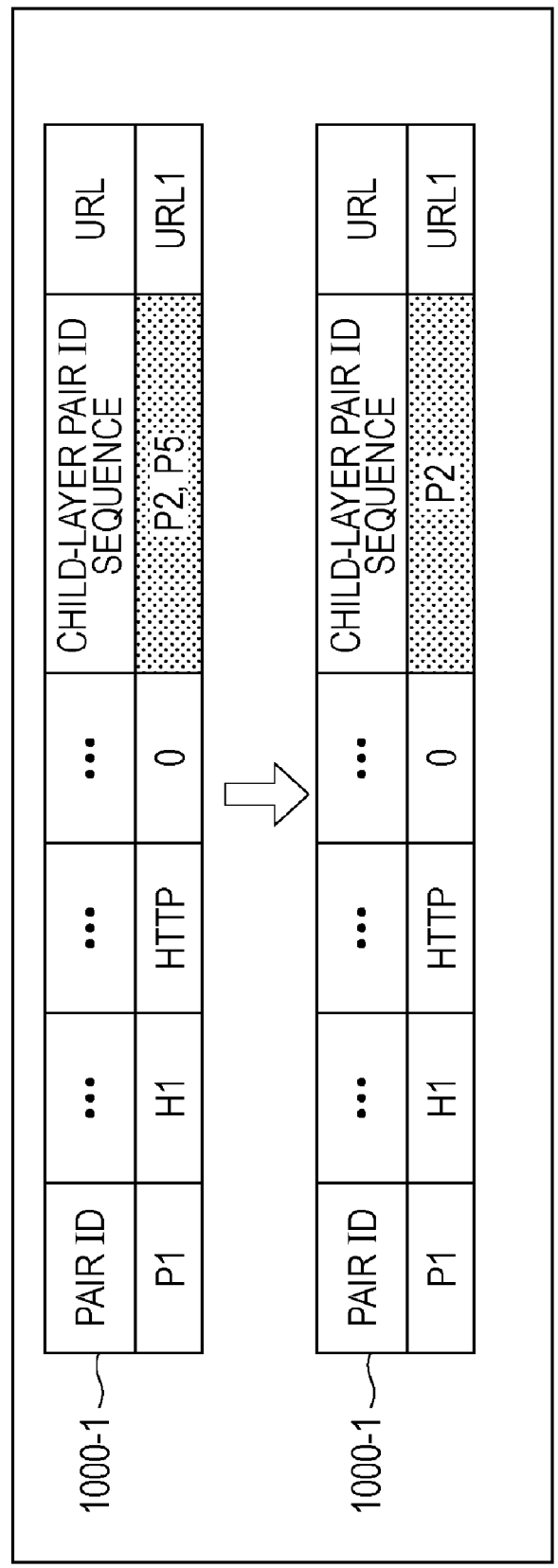
FIG. 24 illustrates an example of eliminating a child-layer pair ID.

FIG. 24 illustrates an example of eliminating a child-layer pair ID. Referring to FIG. 24, the child-layer pair ID "P5" is eliminated from the child-layer pair ID sequence in the parent-child information 1000-1 (see FIG. 10). Accordingly, the child-layer pair P5 having a low possibility of actually having a call relationship with the parent-layer pair P1 can be eliminated.

In the case where the time interval between request messages is within the request screening range, a determination is made for the response screening range in the same manner. That is, the screening unit 2103 calculates the time interval between the response time of the parent-layer pair P1 and the response time of the child-layer pair P5 with reference to the pair information table 800. Here, the time interval is 3 ms.

Then, the screening unit 2103 determines whether the calculated time interval (3 ms) is within the response screening range with reference to the screening range table 2300 on the basis of URL 1. Since the response screening range is "$2.5 \leq t < 4.5$", the time interval (3 ms) is within the range. Note that, if the time interval is out of at least any one of the request screening range and the response screening range, the child-layer pair ID "P5" is eliminated from the child-layer pair ID sequence in the parent-child relationship table 1000.

The determining unit 2104 has a function to determine whether a plurality of candidate parent-layer pairs having a call relationship with a child-layer pair in a lower layer exist on the basis of a count result generated by the counting unit 507. Specifically, the determining unit 2104 determines whether the number of candidate parents is two or more with reference to the number of candidate parents in the parent-child relationship table 1000.

If a plurality of candidate parent-layer pairs exist, the screening unit 2103 screens the child-layer pairs that have been searched for and extracts a child-layer pair in a lower layer having a call relationship with a parent-layer pair in an upper layer. On the other hand, if a plurality of candidate parent-layer pairs do not exist, the screening unit 2103 does not perform screening of child-layer pairs. That is, there is no necessity to screen child-layer pairs if a plurality of candidate parent-layer pairs do not exist. Accordingly, a wasteful screening process can be prevented.

The second calculating unit 506 calculates a processing period of the server as a source of a request message of a parent-layer pair on the basis of the response period of the parent-layer pair and the response period of a child-layer pair in the lower layer extracted by the screening unit 2103.

Specifically, the second calculating unit 506 calculates a processing period of the server with reference to the parent-child relationship table 1000 with the child-layer pair ID being eliminated and the response period table 1200. More specifically, the second calculating unit 506 calculates the processing period of the server, which is the source of the request message of the parent-layer pair, by subtracting the response period of the child-layer pair from the response period of the parent-layer pair. At this time, a child-layer pair having a low possibility of having a call relationship with a parent-layer pair has been eliminated, and thus the processing period of the server can be calculated with high accuracy.

In this specification, screening of child-layer pairs is performed in view of both the request screening range and the response screening range. Alternatively, the screening may be performed in view of any one of the ranges. Alternatively, a child-layer pair in which the time interval is within any one of the request screening range and the response screening range may be regarded as a child-layer pair having a call relationship with a parent-layer pair.

(Procedure of System Analyzing Process in System Analyzing Apparatus)

Hereinafter, a procedure of a system analyzing process in the system analyzing apparatus 2100 according to the second embodiment is described. First, a description is given about a process of setting a screening range to extract a message in a lower layer having a call relationship with a message in an upper layer.

<Procedure of Screening Range Setting Process>

Figure 25:
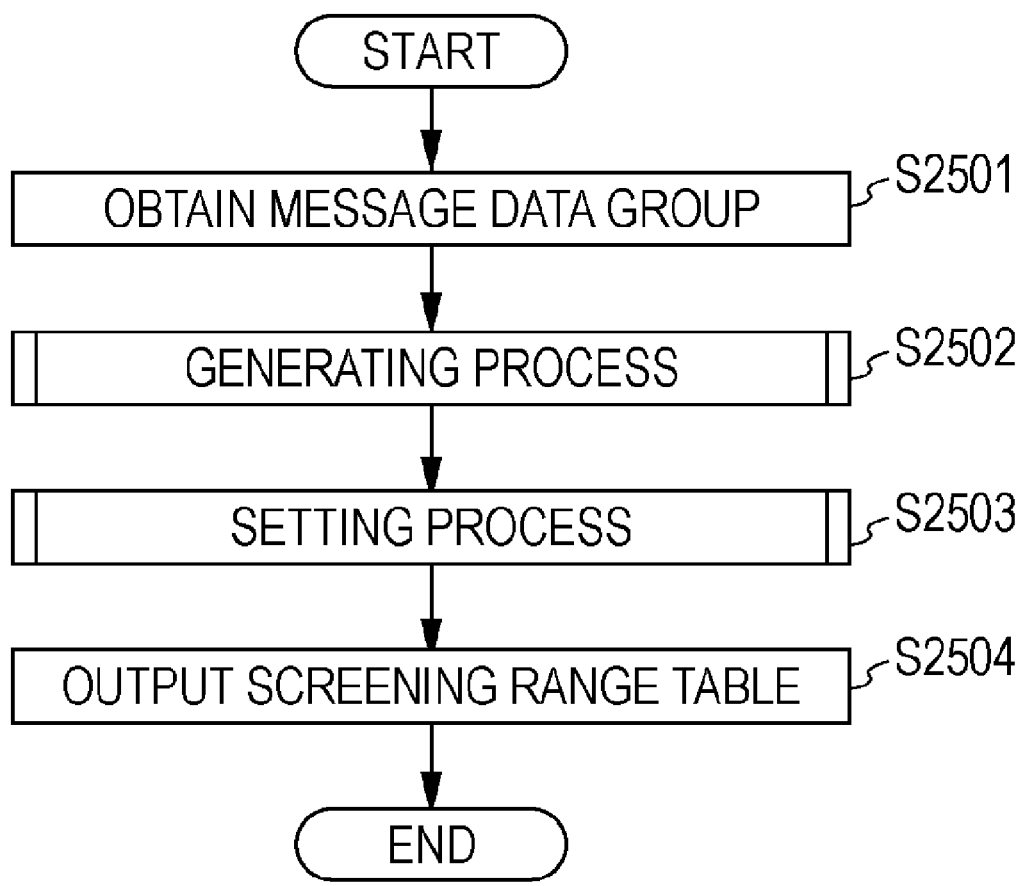
FIG. 25 is a flowchart illustrating an example of a procedure of a screening range setting process.

FIG. 25 is a flowchart illustrating an example of a procedure of a screening range setting process. Referring to the flowchart in FIG. 25, the obtaining unit 501 obtains a message data group transmitted/received between computers in the system (step S2501). Then, the generating unit 2101 executes a generating process of generating a request frequency distribution and a response frequency distribution on the basis of the obtained message data group (step S2502).

Then, the setting unit 2102 executes a setting process of setting a request screening range and a response screening range (step S2503). Finally, the output unit 508 outputs a screening range table (S2504), and the series of processes in this flowchart end. The screening range table is the screening range table 2300 illustrated in FIG. 23, for example.

<Procedure of Generating Process>

Figure 26:
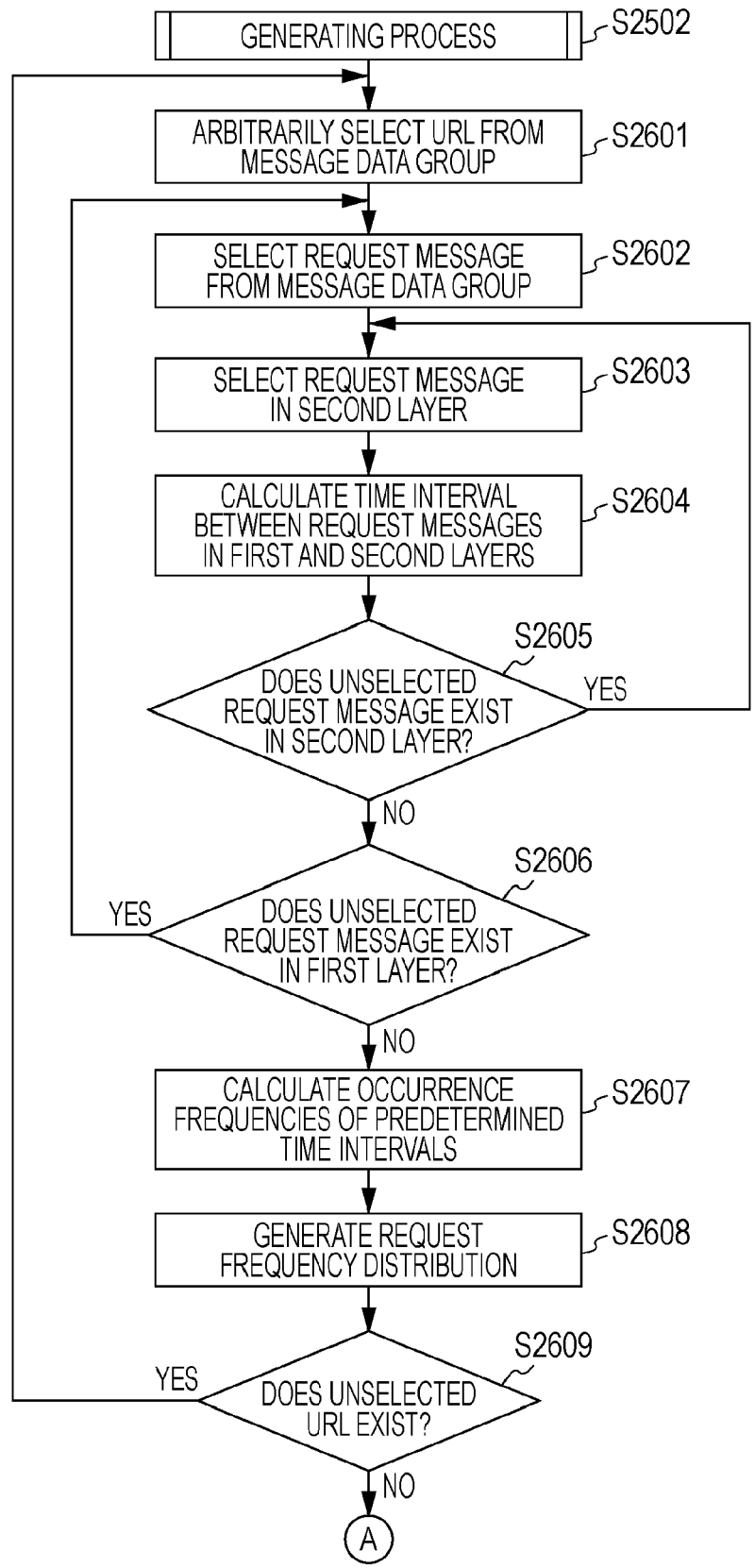
FIG. 26 is a first flowchart illustrating an example of a specific procedure of a generating process performed in step S2502.
Figure 27:
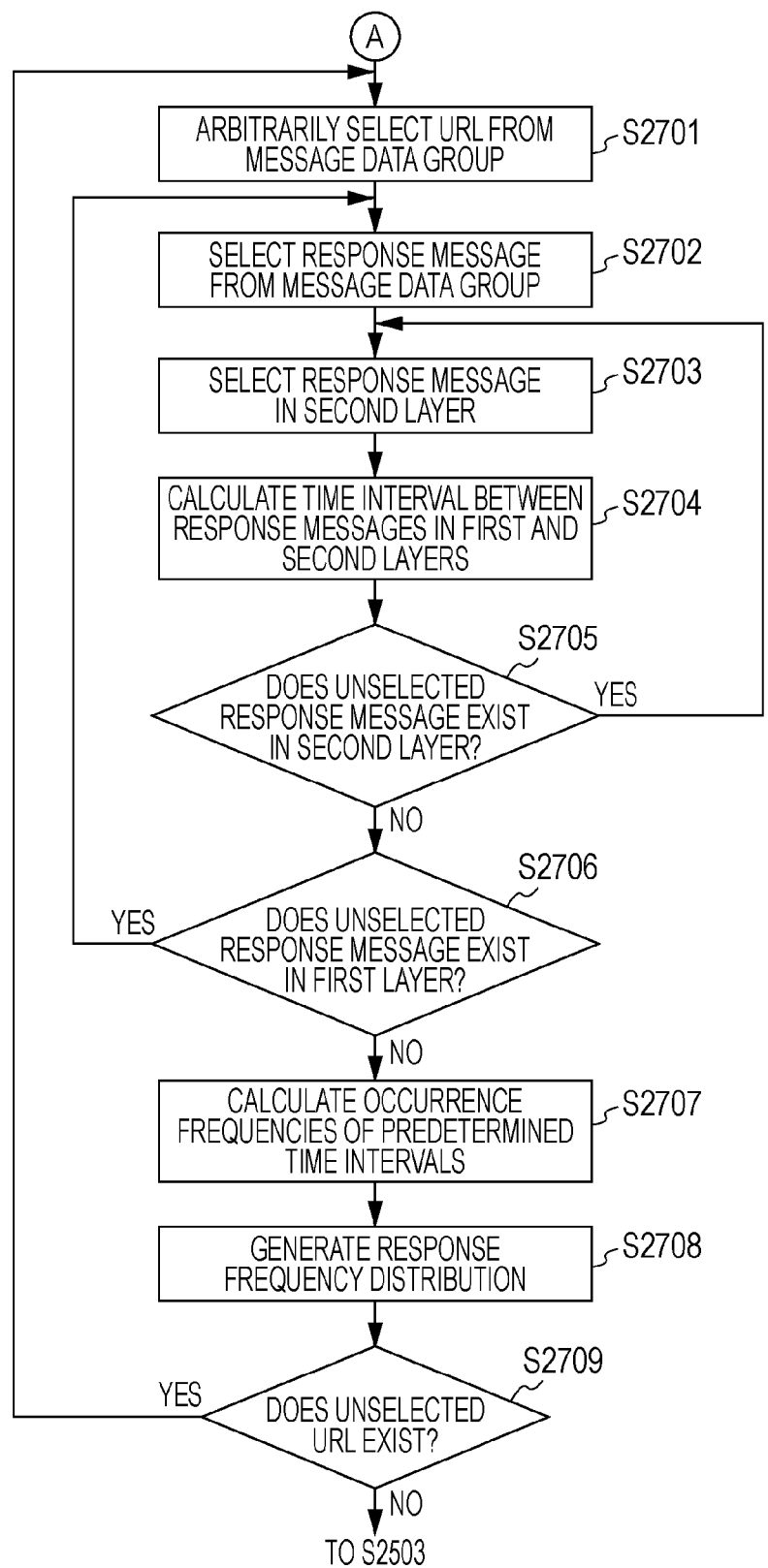
FIG. 27 is a second flowchart illustrating the example of the specific procedure of the generating process performed in step S2502.

Next, a specific procedure of the generating process performed in step S2502 in FIG. 25 is described. FIGS. 26 and 27 are flowcharts illustrating an example of the specific procedure of the generating process performed in step S2502. Referring to the flowchart in FIG. 26, the generating unit 2101 arbitrarily selects a URL from the message data group obtained in step S2501 in FIG. 25 (step S2601).

Then, the generating unit 2101 selects a request message in the first layer corresponding to the selected URL from the message data group (step S2602). Then, the generating unit 2101 selects, from the message data group, a request message in the second layer transmitted after the transmission time of the selected request message (step S2603).

Then, the generating unit 2101 calculates a transmission time interval between the request message in the first layer selected in step S2602 and the request message in the second layer selected in step S2603 (step S2604).

Then, the generating unit 2101 determines whether an unselected request message exists in the second layer (step S2605). If an unselected request message exists in the second layer (YES in step S2605), the process returns to step S2603.

On the other hand, if an unselected request message does not exist in the second layer (NO in step S2605), the generating unit 2101 determines whether an unselected request massage corresponding to the selected URL exists in the first layer (step S2606). If an unselected request message exists in the first layer (YES in step S2606), the process returns to step S2602.

On the other hand, if an unselected request message does not exist in the first layer (NO in step S2606), the generating unit 2101 calculates occurrence frequencies of request messages in the second layer of the respective predetermined time intervals (step S2607). Specifically, the generating unit 2101 calculates the occurrence frequencies of request messages in the second layer of the respective predetermined time intervals on the basis of the time interval between the request messages in the first and second layers.

Then, the generating unit 2101 generates a request frequency distribution by sorting the calculated occurrence frequencies of the respective predetermined time intervals in time series (step S2608). Then, the generating unit 2101 determines whether an unselected URL exists (step S2609). If an unselected URL exists (YES in step S2609), the process returns to step S2601. On the other hand, if an unselected URL does not exist (NO in step S2609), the process proceeds to step S2701 in FIG. 27.

Referring to the flowchart in FIG. 27, the generating unit 2101 arbitrarily selects a URL from the message data group obtained in step S2501 in FIG. 25 (step S2701).

Then, the generating unit 2101 selects a response message in the first layer corresponding to the selected URL from the message data group (step S2702). Then, the generating unit 2101 selects, from the message data group, a response message in the second layer transmitted before the transmission time of the selected response message (step S2703).

Then, the generating unit 2101 calculates a transmission time interval between the response message in the first layer selected in step S2702 and the response message in the second layer selected in step S2703 (step S2704).

Then, the generating unit 2101 determines whether an unselected response message exists in the second layer (step S2705). If an unselected response message exists in the second layer (YES in step S2705), the process returns to step S2703.

On the other hand, if an unselected response message does not exist in the second layer (NO in step S2705), the generating unit 2101 determines whether an unselected response massage corresponding to the selected URL exists in the first layer (step S2706). If an unselected response message exists in the first layer (YES in step S2706), the process returns to step S2702.

On the other hand, if an unselected response message does not exist in the first layer (NO in step S2606), the generating unit 2101 calculates occurrence frequencies of response messages in the second layer of the respective predetermined time intervals (step S2707). Specifically, the generating unit 2101 calculates the occurrence frequencies of response messages in the second layer of the respective predetermined time intervals on the basis of the time interval between the response messages in the first and second layers.

Then, the generating unit 2101 generates a response frequency distribution by sorting the calculated occurrence frequencies of the respective predetermined time intervals in time series (step S2708). Then, the generating unit 2101 determines whether an unselected URL exists (step S2709). If an unselected URL exists (YES in step S2709), the process returns to step S2701. On the other hand, if an unselected URL does not exist (NO in step S2709), the process proceeds to step S2503 in FIG. 25.

In this way, a frequency distribution indicating a relationship between a time interval between messages of the same type in the first and second layers and an occurrence frequency of messages in the second layer can be generated.

<Procedure of Setting Process>

Figure 28:
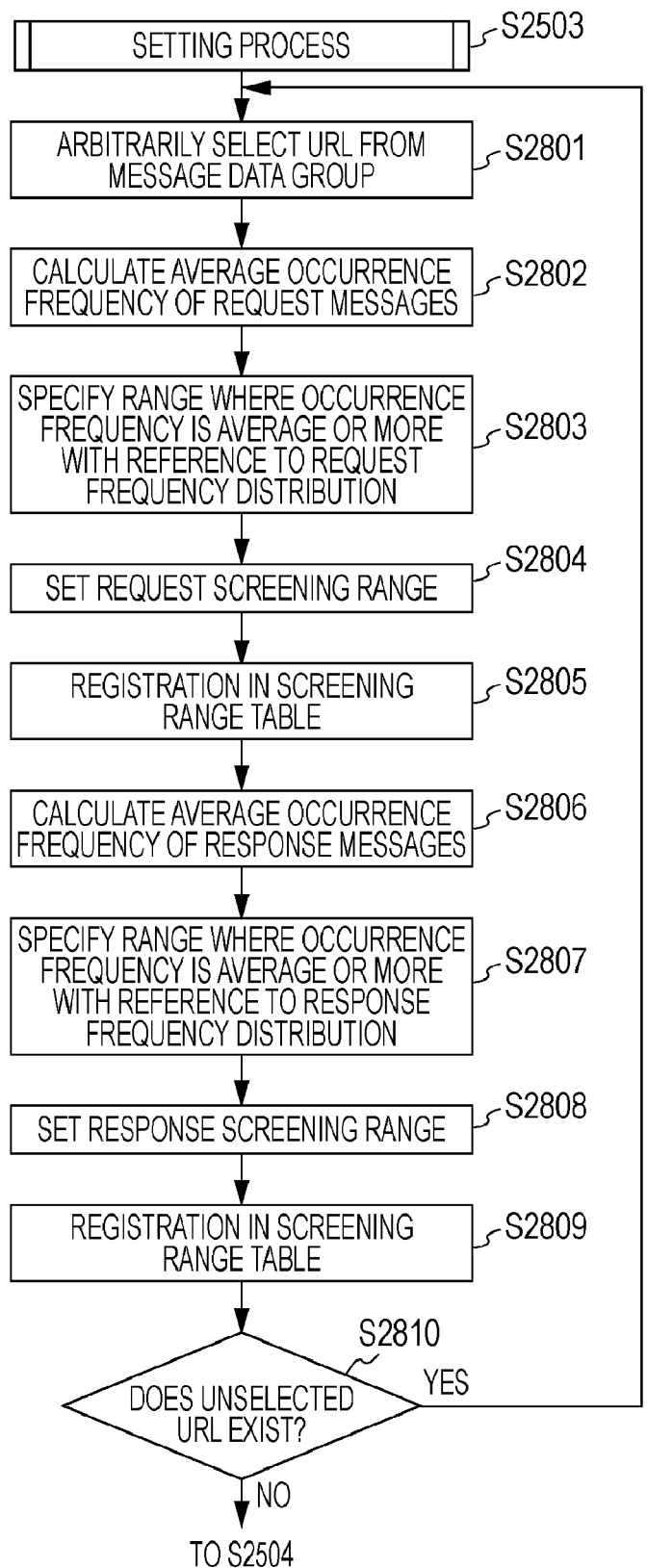
FIG. 28 is a flowchart illustrating an example of a specific procedure of a setting process performed in step S2503.

Next, a specific procedure of the setting process performed in step S2503 in FIG. 25 is described. FIG. 28 is a flowchart illustrating an example of a specific procedure of the setting process performed in step S2503. Referring to the flowchart in FIG. 28, the setting unit 2102 arbitrarily selects a URL from the message data group obtained in step S2501 in FIG. 25 (step S2801).

Then, the setting unit 2102 calculates an average occurrence frequency of request messages in the second layer by using the above expression (1) (step S2802). Note that the average calculated here is the average corresponding to the URL selected in step S2801.

Then, the setting unit 2102 specifies a range where the occurrence frequency of request messages in the second layer is the average or more with reference to the request frequency distribution generated in step S2608 in FIG. 26 (step S2803). Note that the request frequency distribution referred to here is the request frequency distribution corresponding to the URL selected in step S2801.

Then, the setting unit 2102 sets the specified range as a request screening range (step S2804) and registers the request screening range in the screening range table by associating it with the selected URL (step S2805).

Then, the setting unit 2102 calculates an average occurrence frequency of response messages in the second layer by using the above expression (1) (step S2806). Note that the average calculated here is the average corresponding to the URL selected in step S2801.

Then, the setting unit 2102 specifies a range where the occurrence frequency of response messages in the second layer is the average or more with reference to the response frequency distribution generated in step S2708 in FIG. 27 (step S2807). Note that the response frequency distribution referred to here is the response frequency distribution corresponding to the URL selected in step S2801.

Then, the setting unit 2102 sets the specified range as a response screening range (step S2808) and registers the response screening range in the screening range table by associating it with the selected URL (step S2809). Then, the setting unit 2102 determines whether an unselected URL exists (step S2810).

If an unselected URL exists (YES in step S2810), the process returns to step S2801. On the other hand, if an unselected URL does not exist (NO in step S2810), the process proceeds to step S2504 in FIG. 25.

Accordingly, the request screening range and the response screening range to extract a message in the second layer having a call relationship with a message in the first layer can be specified.

<Procedure of System Analyzing Process>

Figure 29:
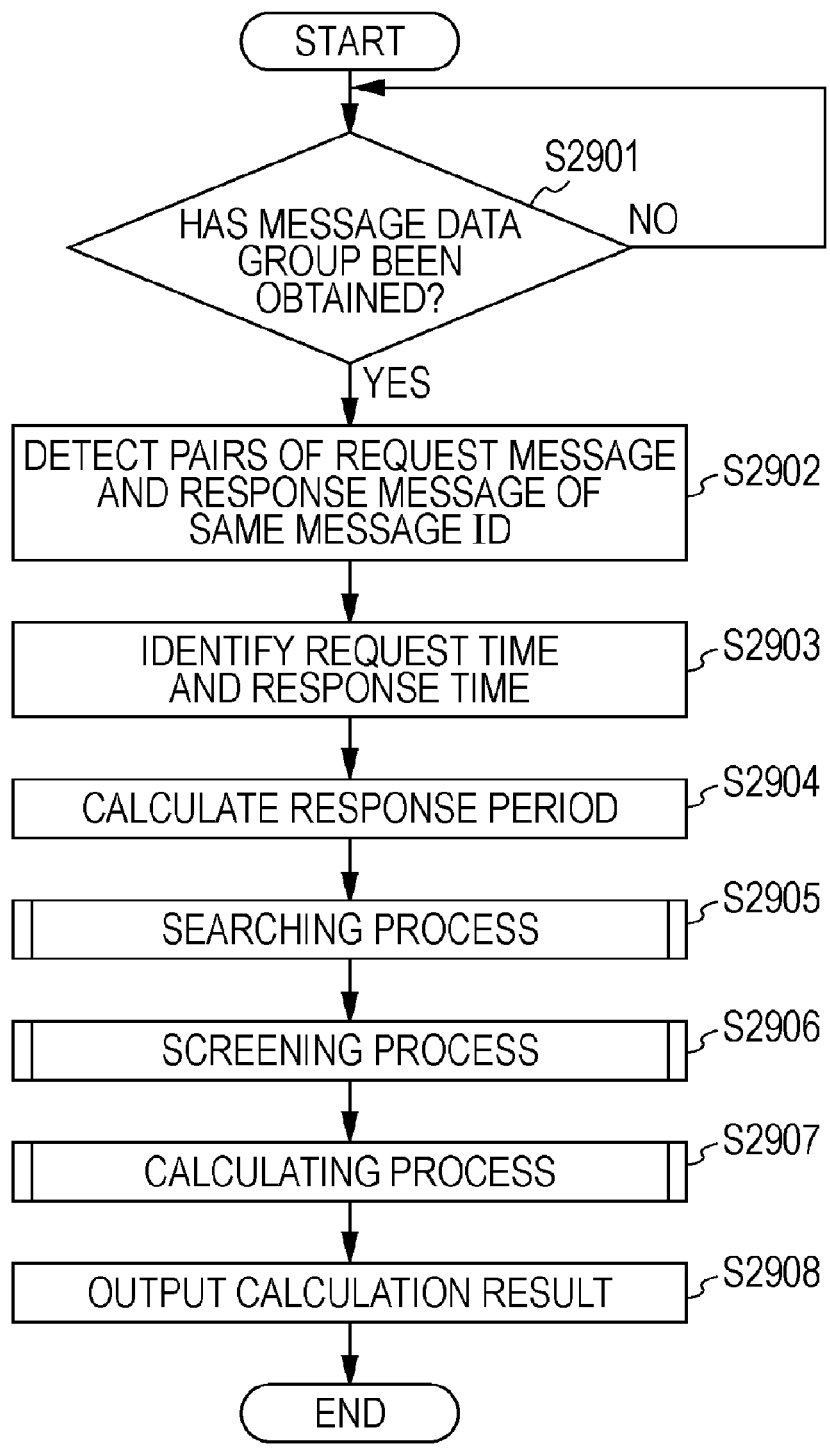
FIG. 29 is a flowchart illustrating an example of a procedure of a system analyzing process performed in the system analyzing apparatus according to the second embodiment.

Next, a procedure of a system analyzing process performed by the system analyzing apparatus 2100 is described. FIG. 29 is a flowchart illustrating an example of the procedure of the system analyzing process performed by the system analyzing apparatus according to the second embodiment. Referring to the flowchart in FIG. 29, the obtaining unit 501 determines whether the message data group transmitted/received between computer apparatuses in the system has been obtained (step 2901).

Acquisition of the message data group is waited for (NO in step S2901), and then if the obtaining unit 501 has obtained the message data group (YES in step S2901), the detecting unit 502 detects pairs of a request message and a response message having the same message ID in the obtained massage data group (step S2902).

Then, the identifying unit 503 identifies the request time and response time of each of the detected pairs on the basis of the transmission time of each piece of message data (step S2903). The first calculating unit 505 calculates a response period from the request time to the response time of each parent-layer pair and child-layer pair by using the specified request time and response time of each pair (step S2904).

Then, on the basis of a result of the identification, the searching unit 504 executes a searching process of searching for child-layer pairs that have a request time and a response time included between the request time and response time of the parent-layer pair selected from among the pairs and that have a protocol of a layer lower than that of the protocol of the parent-layer pair (S2905).

Then, the screening unit 2103 executes a screening process to screen the child-layer pairs that have been searched for and extract a child-layer pair in a lower layer having a call relationship with a parent-layer pair in an upper layer (step S2906). Then, the second calculating unit 506 executes a calculating process to calculate a processing period of the server on the basis the calculation result obtained in step S2904 and the screening result obtained in step S2906 (step S2907).

Finally, the output unit 508 outputs a result of the calculation (step S2908), and then the series of processes in the flowchart end.

<Procedure of Screening Process>

Figure 30:
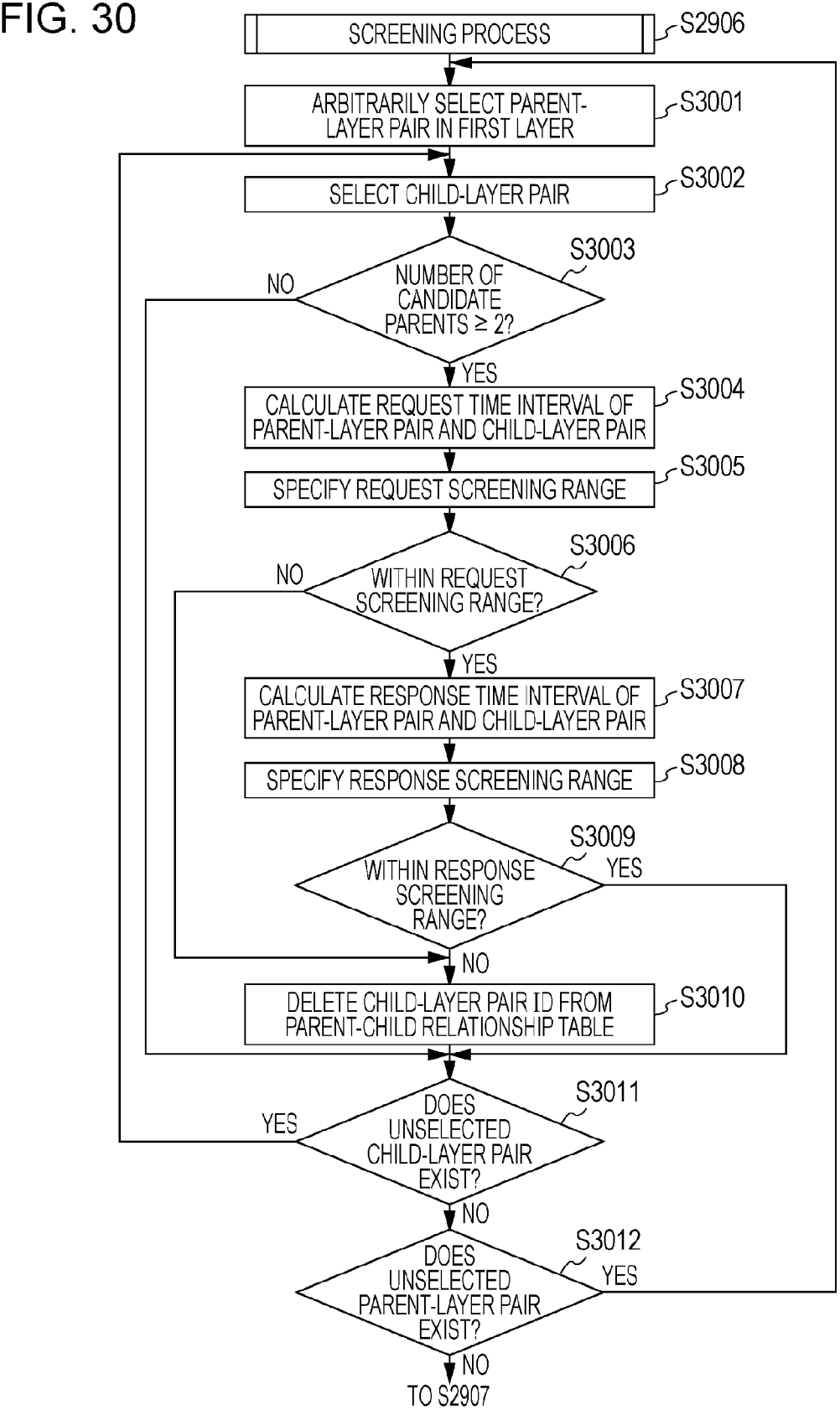
FIG. 30 is a flowchart illustrating an example of a specific procedure of a screening process performed in step S2906.

Hereinafter, a specific procedure of the screening process performed in step S2906 in FIG. 29 is described. FIG. 30 is a flowchart illustrating an example of the specific procedure of the screening process performed in step S2906. Referring to the flowchart in FIG. 30, the screening unit 2103 arbitrarily selects a parent-layer pair in the first layer with reference to the URL in the parent-child relationship table (step S3001). The parent-child relationship table is the parent-child relationship table 1000 illustrated in FIG. 10, for example.

Then, the screening unit 2103 selects a child-layer pair of the selected parent-layer pair with reference to the child-layer pair ID sequence in the parent-child relationship table (step S3002). Then, the determining unit 2104 determines whether the number of candidate parents of the selected child-layer pair is 2 or more with reference to the number of candidate parents in the parent-child relationship table (step S3003).

If the number of candidate parents is 2 or more (YES in step S3003), the screening unit 2103 calculates an interval between the request time of the selected parent-layer pair and the request time of the child-layer pair with reference to the pair information table (step S3004). The pair information table is the pair information table 800 illustrated in FIG. 8, for example. Then, the screening unit 2103 specifies the request screening range corresponding to the URL of the parent-layer pair with reference to the screening range table (step S3005).

Then, the screening unit 2103 determines whether the calculated request time interval is within the specified request screening range (step S3006). If the time interval is within the request screening range (YES in step S3006), the screening unit 2103 calculates an interval between the response time of the selected parent-layer pair and the response time of the child-layer pair with reference to the pair information table (step S3007).

Then, the screening unit 2103 specifies the response screening range corresponding to the URL of the parent-layer pair with reference to the screening range table (step S3008). The screening range table is the screening range table 2300 illustrated in FIG. 23, for example. Then, the screening unit 2103 determines whether the calculated response time interval is within the specified response screening range (step S3009).

If the response time interval is out of the response screening range (NO in step S3009), the screening unit 2103 deletes the ID of the child-layer pair from the child-layer pair ID sequence of the parent-layer pair in the parent-child relationship table (step S3010). Then, the screening unit 2103 determines whether an unselected child-layer pair exists (step S3011).

If an unselected child-layer pair exists (YES in step S3011), the process returns to step S3002. On the other hand, if an unselected child-layer pair does not exist (NO in step S3011), the screening unit 2103 determines whether a parent-layer pair unselected in step S3001 exists (step S3012).

If an unselected parent-layer pair exists (YES in step S3012), the process returns to step S3001. On the other hand, if an unselected parent-layer pair does not exist (NO in step S3012), the process proceeds to step S2907 in FIG. 29.

If it is determined in step S3006 that the request time interval is out of the request screening range (NO in step S3006), the process skips to step S3010. If it is determined in step S3003 that the number of candidate parents is 1 or less (NO in step S3003), the process skips to step S3011. If it is determined in step S3009 that the response time interval is within the response screening range (YES in step S3009), the process skips to step S3011.

Accordingly, candidates of child-layer pairs having a call relationship with a parent-layer pair can be screened to extract a child-layer pair having a high possibility of having a call relationship with a parent-layer pair.

A description about a specific procedure of the calculating process performed in step S2907 is omitted because the procedure is the same as that of the calculating process illustrated in FIG. 19. Note that the parent-child relationship table to be referred to is the parent-child relationship table with the child-layer pair ID being deleted in step S3010 in FIG. 30.

As described above, according to the second embodiment, a frequency distribution indicating a relationship between a time interval between messages of the same type in upper and lower layers adjacent to each other and an occurrence frequency of messages in the lower layer can be generated. Also, according to the second embodiment, a range regarding a transmission time of a message in the lower layer having a call relationship with a message in the upper layer can be specified by using the generated frequency distribution. Also, according to the second embodiment, candidate child-layer pairs having a call relationship with a parent-layer pair are screened by using a specified range, whereby a child-layer pair having a high possibility of having a call relationship with a parent-layer pair can be specified.

Accordingly, a response period of child-layer pairs can be appropriately distributed to parent-layer pairs, averaging of a processing period of the server among works can be suppressed, and the accuracy of system analysis can be increased. Furthermore, an influence of screening in the upper two layers (first and second layers) is exerted on lower layers (second and third layers), so that a response period of child-layer pairs can be appropriately distributed to parent-layer pairs in the lower layers.

Also, according to the second embodiment, screening of child-layer pairs may be executed only in the case where a plurality of candidate parent-layer pairs of the child-layer pairs exist. Accordingly, a wasteful screening process can be prevented.

The system analyzing method according to the embodiment may be implemented by allowing a computer, such as a personal computer or a work station, to execute a prepared program. The program may be recorded on a computer-readable recording medium, such as a hard disk, a flexible disk, a CD-ROM, an MO, or a DVD, and may be executed by a computer by being read from the recording medium. The program may also be a medium that can be distributed via a network, such as the Internet.

What is claimed is:

1. A non-transitory computer-readable recording medium storing a system analyzing program containing instructions executed on a computer, the system analyzing program causing the computer to execute:

an obtaining procedure which obtains a message data group including a message ID, a protocol, a type, and a transmission time of one or more messages transmitted/received in a system where a hierarchical structure of protocols is defined;

a detecting procedure which detects one or more pairs of a request message and a response message with a same message ID from the obtained message data group;

an identifying procedure which identifies a request time and a response time of each of the detected pairs;

a searching procedure which arbitrarily selects a pair and designates the selected pair as a parent-layer pair, and the search procedure searches for one or more child-layer pairs on the basis of the response times and request times identified in the identifying procedure, each child-layer pair having a request time and a response time between a request time and a response time of the parent-layer pair, each child-layer pair further having a protocol that is lower than a protocol of the parent-layer pair, the search procedure generating a search result that indicates a call relationship between the parent-layer pair and all child-layer pairs found;

an outputting procedure which outputs the found child-layer pairs as candidate pairs having a call relationship with the parent-layer pair;

a counting procedure which counts a number of candidates of parent-layer pairs having a call relationship with a given child-layer pair on the basis of a search result generated in the searching procedure;

a first calculating procedure which calculates a response period from a request to a response of the parent-layer pair by using the identified request time and response time of the parent-layer pair, the first calculating procedure further calculating a response period from a request to a response of each child-layer pair by using the identified request time and response time of the child-layer pair; and a second calculating procedure which calculates the processing period of the server that is the destination of the request message of the parent-layer pair by subtracting the response period of the child-layer pair from the response period of the parent-layer pair by referring to a parent-child relationship table and a response period table, wherein when the counting procedure determines that a plurality of parent-layer pairs have a call relationship with the child-layer pair, the second calculating procedure divides the response period of the child-layer pair by the number of parent-layer pairs before performing the subtraction when calculating the processing period of the request message for each of the parent-layer pairs.

2. The non-transitory computer-readable recording medium according to claim 1, wherein the one or more child-layer pairs that are searched for in the searching procedure each have a protocol in the layer immediately under a protocol of the selected parent-layer pair.

3. The non-transitory computer-readable recording medium according to claim 1, wherein the outputting procedure outputs the processing period of the server calculated in the second calculating procedure.

4. The non-transitory computer-readable recording medium according to claim 3, wherein, if the protocol of the child-layer pair is in a lowest layer, the outputting procedure outputs the response period of the child-layer pair as a processing period of a server that is a destination of a request message of the child-layer pair.

5. The non-transitory computer-readable recording medium according to claim 1, wherein the searching procedure repeatedly executes a searching process until there is no parent-layer pair selected from among the remaining parent and child-layer pairs having protocols other than a protocol in a lowest layer, and wherein the counting procedure counts the number of candidates of parent-layer pairs having a call relationship with the child-layer pair on the basis of a search result generated in the searching procedure.

6. The non-transitory computer-readable recording medium according to claim 1, wherein the parent-layer pair is a pair arbitrarily selected from among remaining parent and child-layer pairs having protocols other than a protocol in a lowest layer.

7. The non-transitory computer-readable recording medium according to claim 3, wherein the search procedure registers the address of the request message of one or more parent-layer pairs wherein, for one or more addresses in one or more arbitrarily designated time slots, the second calculating procedure calculates an average processing period of the server by totaling processing periods of the server that is the destination of the request message of the parent-layer pair, each address identified by the request message having a protocol in a highest layer, and wherein the outputting procedure outputs the average processing period of the server calculated in the second calculating procedure.

8. The non-transitory computer-readable recording medium according to claim 7, wherein the second calculating procedure calculates the average processing period of the server by totaling the processing periods of a server that is the destination of the request message of the child-layer pair in a lowest layer of the address in the arbitrarily designated time slot.

9. The non-transitory computer-readable recording medium according to claim 8, wherein the outputting procedure outputs, for each address, the processing period of a server that is the destination of the request message of the protocol in each layer from a highest layer to a lowest layer of the arbitrary designated address.

10. The non-transitory computer readable recording medium according to claim 7, the system analyzing program further causing the computer to execute:

a generating procedure of generating a frequency distribution indicating a relationship between a transmission time interval between messages of a same type in one or more upper and lower layers of the message data group adjacent to each other and an occurrence frequency of messages in the lower layer on the basis of the message data group; and a setting procedure of setting a range regarding a transmission time of a message in the lower layer having a call relationship with a message in the upper layer of the generated frequency distribution, wherein the outputting procedure outputs a result of the setting procedure.

11. The non-transitory computer-readable recording medium according to claim 10, the system analyzing program further causing the computer to execute:

a screening procedure of screening child-layer pairs that have been searched for to extract a child-layer pair in the lower layer having a call relationship with a parent-layer pair in the upper layer on the basis of the range set by the setting procedure, wherein the second calculating procedure calculates a processing period of a server as a source of a request message of a parent-layer pair in the upper layer on the basis of a response period of the parent-layer pair and a response period of the extracted child-layer pair in the lower layer.

12. The non-transitory computer-readable recording medium according to claim 11, the system analyzing program further causing the computer to execute:
- a determining procedure of determining whether a plurality of candidates of parent-layer pairs having a call relationship with a child-layer pair in the lower layer exist,
- wherein the screening procedure extracts a child-layer pair in the lower layer having a call relationship with the parent-layer pair in the upper layer if the determining procedure determines that a plurality of candidates exist.

13. A system analyzing apparatus comprising:
a memory; and
a processor for executing a process comprising:
- obtaining a message data group including a message ID, a protocol, a type, and a transmission time of one or more messages transmitted/received in a system where a hierarchical structure of protocols is defined;
- detecting one or more pairs of a request message and a response message of a same message ID from the obtained message data group;
- identifying a request time and a response time of each of the detected pairs;
- searching for child-layer pairs by arbitrarily selecting a pair and designating the selected pair as a parent-layer pair, and searching for one or more child-layer pairs on the basis of the response times and request times identified in the identifying procedure, each child-layer pair having a request time and a response time between a request time and a response time of the parent-layer pair, each child-layer pair further having a protocol that is lower than a protocol of the parent-layer pair, the searching generating a search result that indicates a call relationship between the parent-layer pair and all child-layer pairs found; and
- outputting the found child-layer pairs as a candidate pair having a call relationship with the parent-layer pair;
- counting a number of candidates of parent-layer pairs having a call relationship with a given child-layer pair on the basis of a search result generated in the searching procedure;
- calculating a response period from a request to a response of the parent-layer pair by using the identified request time and response time of the parent-layer pair, and calculating a response period from a request to a response of each child-layer pair by using the identified request time and response time of the child-layer pair; and
- calculating the processing period of the server that is the destination of the request message of the parent-layer pair by subtracting the response period of the child-layer pair from the response period of the parent-layer pair by referring to a parent-child relationship table and a response period table,
- wherein when the counting determines that a plurality of parent-layer pairs have a call relationship with the child-layer pair, the response period of the child-layer pair is divided by the number of parent-layer pairs before performing the subtraction when calculating the processing period of the request message for each of the parent-layer pairs.

14. A system analyzing method executed by a computer, the method comprising:
- obtaining a message data group including a message ID, a protocol, a type, and a transmission time of one or more messages transmitted/received in a system where a hierarchical structure of protocols is defined;
- detecting one or more pairs of a request message and a response message of a same message ID from the obtained message data group;
- identifying a request time and a response time of each of the detected pairs;
- arbitrarily selecting a pair and designating the selected pair as a parent-layer pair, searching for one or more child-layer pairs on the basis of the response times and request times identified in the identifying procedure, each child-layer pair having a request time and a response time between a request time and a response time of the parent-layer pair, each child-layer pair further having a protocol that is lower than a protocol of the parent-layer pair, and generating a search result that indicates a call relationship between the parent-layer pair and all child-layer pairs found; and
- outputting the found child-layer pairs as candidate pairs having a call relationship with the parent-layer pair;
- counting a number of candidates of parent-layer pairs having a call relationship with a given child-layer pair on the basis of a search result generated in the searching procedure;
- calculating a response period from a request to a response of the parent-layer pair by using the identified request time and response time of the parent-layer pair, and calculating a response period from a request to a response of each child-layer pair by using the identified request time and response time of the child-layer pair; and
- calculating the processing period of the server that is the destination of the request message of the parent-layer pair by subtracting the response period of the child-layer pair from the response period of the parent-layer pair by referring to a parent-child relationship table and a response period table,
- wherein when the counting step determines that a plurality of parent-layer pairs have a call relationship with the child-layer pair, the response period of the child-layer pair is divided by the number of parent-layer pairs before performing the subtraction when calculating the processing period of the request message for each of the parent-layer pairs.

* * * * *